(12) United States Patent  
Kwon et al.

(10) Patent No.: US 11,741,869 B2  
(45) Date of Patent: Aug. 29, 2023

(54) ELECTRONIC DEVICE INCLUDING VARIABLE DISPLAY AND METHOD OF OPERATING THE SAME

(71) Applicant: SAMSUNG ELECTRONICS CO., LTD., Suwon-si (KR)

(72) Inventors: Yongjin Kwon, Suwon-si (KR); Jookwan Lee, Suwon-si (KR); Soyoung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/517,122

(22) Filed: Nov. 2, 2021

(65) Prior Publication Data

US 2022/0148474 A1 May 12, 2022

Related U.S. Application Data

(63) Continuation of application No. PCT/KR2021/015287, filed on Oct. 28, 2021.

(30) Foreign Application Priority Data

Nov. 6, 2020 (KR) ........................ 10-2020-0148047  
Dec. 11, 2020 (KR) ........................ 10-2020-0173404

(51) Int. Cl.  
*G06F 3/041* (2006.01)  
*G09G 3/00* (2006.01)  
(Continued)

(52) U.S. Cl.  
CPC ............. *G09G 3/035* (2020.08); *G01B 21/22* (2013.01); *G01J 1/4204* (2013.01); *G01S 17/08* (2013.01);  
(Continued)

(58) Field of Classification Search  
None  
See application file for complete search history.

(56) References Cited

U.S. PATENT DOCUMENTS 8,654,095 B1 * 2/2014 Cho ...................... G06F 1/1652  
                                                                             345/173  
8,665,227 B2 3/2014 Gunawan  
(Continued)

FOREIGN PATENT DOCUMENTS

KR 10-2015-0144992 12/2015  
KR 10-2017-0038308 A 4/2017  
(Continued)

OTHER PUBLICATIONS

Search Report dated Feb. 21, 2022 in counterpart International Patent Application No. KR2021/015287.

*Primary Examiner* — Carl Adams  
(74) *Attorney, Agent, or Firm* — Nixon & Vanderhye P.C.

(57) ABSTRACT

An electronic device includes: a housing including a first side, a second side, a third side, and a fourth side, a variable display coupled to the housing and having a changeable position of a side area surrounding the first side, a sensor configured to detect a change in the position of the side area, and a processor electrically connected to the variable display and the sensor, wherein the processor may be configured to: obtain data on a state change of the variable display through the sensor, calculate an amount of change in the position of the side area based on the data on the state change, and change display coordinates of a soft key based on the calculated amount of change.

20 Claims, 18 Drawing Sheets

(51) Int. Cl.
  *G01J 1/42* (2006.01)
  *G01B 21/22* (2006.01)
  *G01S 17/08* (2006.01)
  *G06V 40/18* (2022.01)
  *G06V 40/16* (2022.01)

(52) U.S. Cl.
  CPC .... *G06F 3/041* (2013.01); *G06F 2203/04108* (2013.01); *G06V 40/161* (2022.01); *G06V 40/18* (2022.01); *G09G 2330/022* (2013.01); *G09G 2340/0464* (2013.01); *G09G 2354/00* (2013.01); *G09G 2360/144* (2013.01)

(56) References Cited

U.S. PATENT DOCUMENTS

| | | |
|---|---|---|
| 9,524,057 B2 | 12/2016 | Cho et al. |
| 10,444,978 B2 | 10/2019 | Lee |
| 10,452,156 B2 | 10/2019 | Kang et al. |
| 10,470,538 B2 | 11/2019 | Kim |
| 10,955,957 B2 | 3/2021 | Lee et al. |
| 10,963,044 B2 | 3/2021 | Tao et al. |
| 11,051,413 B2 | 6/2021 | Yang et al. |
| 2011/0115711 A1 | 5/2011 | Gunawan |
| 2014/0191110 A1* | 7/2014 | Holenarsipur ........ G06F 3/0421 250/206 |
| 2015/0370413 A1 | 12/2015 | Cho et al. |
| 2015/0378592 A1 | 12/2015 | Kim |
| 2016/0299531 A1* | 10/2016 | Vertegaal ............ G06F 3/04886 |
| 2018/0095528 A1 | 4/2018 | Tao et al. |
| 2019/0261519 A1 | 8/2019 | Park et al. |
| 2020/0337159 A1 | 10/2020 | Yang et al. |
| 2021/0240294 A1 | 8/2021 | Ko et al. |

FOREIGN PATENT DOCUMENTS

| | | |
|---|---|---|
| KR | 10-2017-0083404 | 7/2017 |
| KR | 10-2018-0090635 A | 8/2018 |
| KR | 10-2019-0001388 A | 1/2019 |
| KR | 10-2019-0101184 | 8/2019 |
| KR | 10-2019-0124009 | 11/2019 |

* cited by examiner

ELECTRONIC DEVICE INCLUDING VARIABLE DISPLAY AND METHOD OF OPERATING THE SAME

TECHNICAL FIELD

The disclosure relates to an electronic device including a variable display with a variable shape, such as a slide type, a rollable type, and a foldable type, and a method of operating the same.

BACKGROUND ART

In recent years, various types of electronic devices have been developed to secure a more expanded display area without interfering with portability. For example, variable display electronic devices may include a slide type electronic device in which a state of the display is changed while at least one side of a housing slides, a rollable type electronic device in which a display area exposed to the outside of the electronic device is expanded while the display wound on the interior or exterior of the housing is unfolded and a foldable type electronic device in which the display area of the display is expanded/reduced as a folded housing is unfolded.

CROSS-REFERENCE TO RELATED APPLICATIONS

This application is a continuation of International Application No. PCT/KR2021/015287 designating the United States, filed on Oct. 28, 2021, in the Korean Intellectual Property Receiving Office and claiming priority to Korean Patent Application No. 10-2020-0148047, filed on Nov. 6, 2020, and Korean Patent Application No. 10-2020-0173404, filed on Dec. 11, 2020, in the Korean Intellectual Property Office, the disclosures of which are incorporated by reference herein in their entireties.

DISCLOSURE

Technical Problem

The variable display electronic devices have the advantage that the shape of the display is changed as needed, but do not have enough space to mount a hardware button generally disposed in a side housing because at least one side of the display is bent to cover the outer surface of the housing of the electronic device. Accordingly, the soft key may be displayed on a display screen, but the position where the soft key is displayed may be also required to be changed as the display shape of the variable display is changed.

Embodiments of the disclosure provide an electronic device including a variable display, which adaptively displays a soft key on the variable display by detecting a change in a display shape and updating display coordinates of the soft key to correspond to the changed display shape, and a method of operating the electronic device.

Embodiments of the disclosure provide an electronic device including a variable display, which adaptively displays a soft key in consideration of at least one of an orientation of the electronic device (horizontal direction, vertical direction), a grip state, a low power mode, and an AOD mode of the electronic device, and a method of operating the electronic device.

Technical Solution

An electronic device according to an example embodiment includes: a housing including a first side, a second side, a third side, and a fourth side, a variable display coupled to the housing and having a changeable position of a side area surrounding the first side, a sensor configured to detect a change in the position of the side area, and a processor electrically connected to the variable display and the sensor, wherein the processor is configured to: obtain data on a state change of the variable display through the sensor, calculate an amount of change in the position of the side area based on the data on the state change, and change display coordinates of a soft key based on the calculated amount of change.

According to an example embodiment of the disclosure, a method of displaying a soft key on a variable display of an electronic device includes: obtaining data on a change in a state of the variable display through a sensor of the electronic device, calculating an amount of change in a position of a side area of the variable display based on the data on the state change, the side area being an area corresponding to a portion of the variable display surrounding a first side of a housing of the electronic device, and changing display coordinates of the soft key based on the calculated amount of change.

Advantageous Effects

According to various example embodiments of the disclosure, it is possible to provide an electronic device including a variable display, which adaptively displays a soft key on the variable display by detecting a change in a housing and/or a display shape and updating display coordinates of the soft key to correspond to the changed housing and/or display shape, and a method of operating the electronic device.

According to various example embodiments of the disclosure, it is possible to provide an electronic device including a variable display, which adaptively displays a soft key in consideration of at least one of an orientation of the electronic device (horizontal direction, vertical direction), a grip state, a low power mode, and an AOD mode of the electronic device, and a method of operating the electronic device.

In addition, various effects may be provided that are directly or indirectly understood through the disclosure.

DESCRIPTION OF DRAWINGS

In the description of the drawings, the same or similar reference numerals may be used for the same or similar components.

MODE FOR INVENTION

Hereinafter, various example embodiments of the disclosure may be described with reference to accompanying drawings. Accordingly, those of ordinary skill in the art will recognize that various modifications, equivalents, and/or alternatives on the various example embodiments described herein can be variously made without departing from the scope and spirit of the disclosure.

Figure 1:
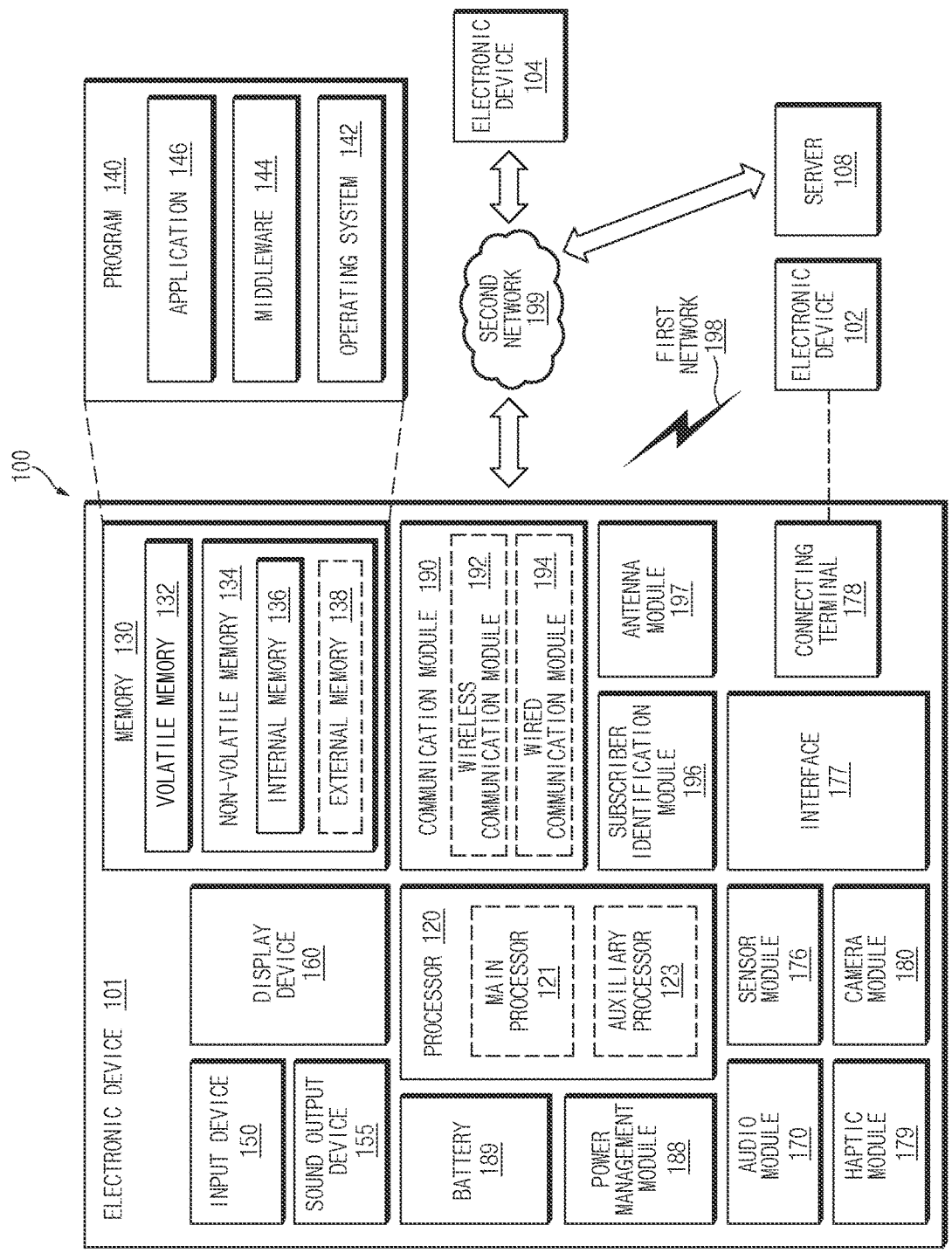
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Hereinafter, an electronic device according to various example embodiments will be described in greater detail with reference to FIGS. 2, 3, and 4.

Figure 2:
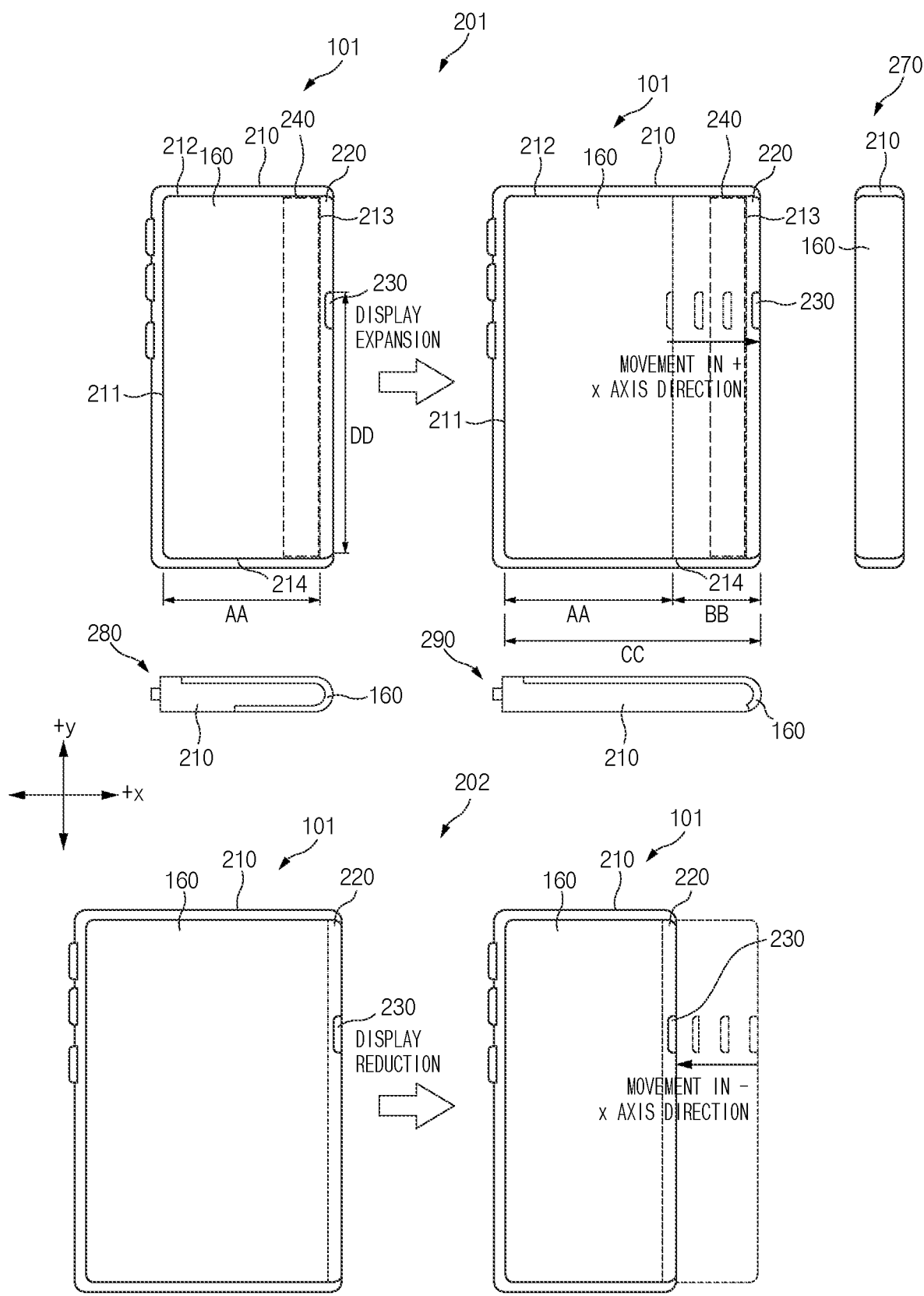
FIG. 2 is a diagram illustrating an electronic device according to various embodiments.

FIG. 2 is a diagram illustrating various views (201, 202) of an electronic device according to various embodiments. FIG. 3 is a flowchart (300) illustrating an example operation of an electronic device according to various embodiments. FIG. 4 is a block diagram (400) illustrating an example configuration of an electronic device according to various embodiments.

Referring to FIG. 2, the electronic device 101 (e.g., the electronic device 101 of FIG. 1) may include a housing 210 including a body of the electronic device 101 and a display 160 coupled to the housing 210 (e.g., the display module 160 of FIG. 1).

The display 160 may include four sides of a left side 211 (e.g., −x direction), an upper side 212 (e.g., +y direction), a right side 213 (e.g., +x direction), and a lower side 214 (e.g., −y direction), with respect to a front surface of the electronic device 101 and at least one side surface may be exposed to the outside without being covered by the housing. When a first case 201 of FIG. 2 is taken as an example, the left side 211, the upper side 212, and the lower side 214 of the display 160 are covered by the housing 210, and the right side 213 may be positioned on the outer surface of the housing 210 and bent so as to cover the housing 210. The first side view 270 of FIG. 2 is a view showing the electronic device 101 viewed in a direction from the +x-axis to the −x-axis, and in the first side view 270, the display 160 may cover the housing 210. Hereinafter, in various embodiments of the disclosure, a portion corresponding to one side of the display 160 which is being bent to cover the outer surface of the housing 210 may be referred to as a side area 220 of the display 160.

Hereinafter, in various embodiments of the disclosure, the display 160 may be a variable display. According to an embodiment, the display 160 of the electronic device 101 may have a width of a first distance AA in the minimum size. According to an embodiment, an extended width of the display 160 with respect to the minimum size of the display 160 may be defined as a second distance BB. A third distance CC may be defined as the sum of the first distance AA and the second distance BB, and the variable display may refer to a display in which the third distance CC is variable. In addition, the above-described side area 220 of the display 160 may be located at the third distance CC along the +x-axis from a left end of the display 160, and the variable display may refer to a display in which a position of the side area 220 is variable.

The variable display 160 may have one of a slide type in which the side area 220 is changed while at least one side of the housing 210 of the electronic device 101 is sliding, a rollable type in which a display area exposed to the outside of the electronic device 101 is expanded and the side area 220 is also moved as the display 160 wound on the interior or exterior of the housing 210 is unfolded, or as a foldable type in which the display area of the display 160 is expanded/reduced and the side area 220 is also moved as the folded housing 210 is unfolded. The electronic device 101 of FIG. 2 is the slide-type electronic device 101, and a second side view 280 and a third side view 290 of FIG. 2 show the electronic device 101 viewed in a direction from the −y-axis to +y-axis. When one side of the housing 210 shown in the second side view 280 slides for expansion as shown in the third side view 290, a front portion of of the display 160 of the electronic device 101 may also be expanded.

Referring to the first case 201 of FIG. 2, while the display area of the display 160 is expanded in the +x-axis direction, the side area 220 may be moved in the +x-axis direction on the entire screen of the display 160. Referring to the second case 202 of FIG. 2, while the display area of the display 160 is reduced in the −x-axis direction, the side area 220 may be moved in the −x-axis direction on the entire screen of the display 160.

A soft key 230 may be a button displayed on the display 160, and according to settings, may correspond to at least one of a power key, a volume key, a home key, a back key, a recently used app key, a voice assistant key, a shortcut key, an app shortcut key, a contact shortcut key, a capture key, and a shortcut bar key, but is not limited thereto.

The soft key 230 may be displayed in an area corresponding to at least one of the left side 211, the upper side 212, the right side 213, and the lower side 214 of the display 160 for the user's touch convenience without interfering with the displayed contents of the display 160 or may be displayed at a position adjacent thereto. In various embodiments of the disclosure, it may be assumed that the soft key 230 is displayed in the display 160, in particular, in the side area 220 of which the position is changeable or in a first area 240 adjacent to the side area 220.

According to an embodiment, the soft key 230 may be displayed based on a reference coordinate having the third distance CC as an x-coordinate and a fourth distance DD as a y-coordinate (in other words, (CC, DD)). The fourth distance DD may be a distance set by a user or may be a distance that is changed according to circumstances, as in an embodiment to be described with reference to FIGS. 7 and 8. A method for determining the third distance CC in the electronic device 101 will be described later in detail with reference to FIGS. 3 and 4.

The processor 120 of the electronic device 101 may determine a pixel position in the x-axis direction by multiplying the third distance CC, which is the x-axis coordinate of the reference coordinate, by a pixel density (or display density). In addition, the processor 120 of the electronic device 101 may determine the pixel position in the y-axis direction by multiplying the fourth distance DD, which is the y-axis coordinate of the reference coordinate by the pixel density.

The processor 120 of the electronic device 101 may determine the pixel position in the x-axis direction by adding a pixel position corresponding to the first distance AA to a value obtained by multiplying the second distance BB by the pixel density.

Although the soft key 230 is illustrated to be displayed within the side area 220 in FIG. 2, the soft key 230 is not limited thereto, and may be displayed in the first area 240 adjacent to the side area 220. A method of determining reference coordinate for displaying the soft key 230 when the soft key 230 is displayed in the side area 220 may be applied to a case where the soft key 230 is displayed in the first area 240. However, the x-axis coordinate of the reference coordinate when the soft key 230 is displayed in the first area 240 may be determined to be less than the x-axis coordinate of the reference coordinate when the soft key 230 is displayed in the side area 220 by a predetermined value (because the first area 240 is moved by the predetermined value in the −x-axis direction rather than the side area 220).

Referring to the first case 201 of FIG. 2, when the side area 220 is moved in the +x-axis direction on the entire screen of the display 160 as the display area of the display 160 is expanded in the +x-axis direction, the x-axis coordinate of the reference coordinate for displaying the soft key 230 corresponding to the side area 220 may also be moved in the +x-axis direction.

Referring to the second case 202 of FIG. 2, when the side area 220 is moved in the −x-axis direction on the entire screen of the display 160 as the display area of the display 160 is reduced in the −x-axis direction, the x-axis coordinate of the reference coordinate for displaying the soft key 230 corresponding to the side area 220 may also be moved in the −x-axis direction.

Hereinafter, example operations of the electronic device 101 when identifying a display change event will be described with reference to FIG. 3.

Figure 3:
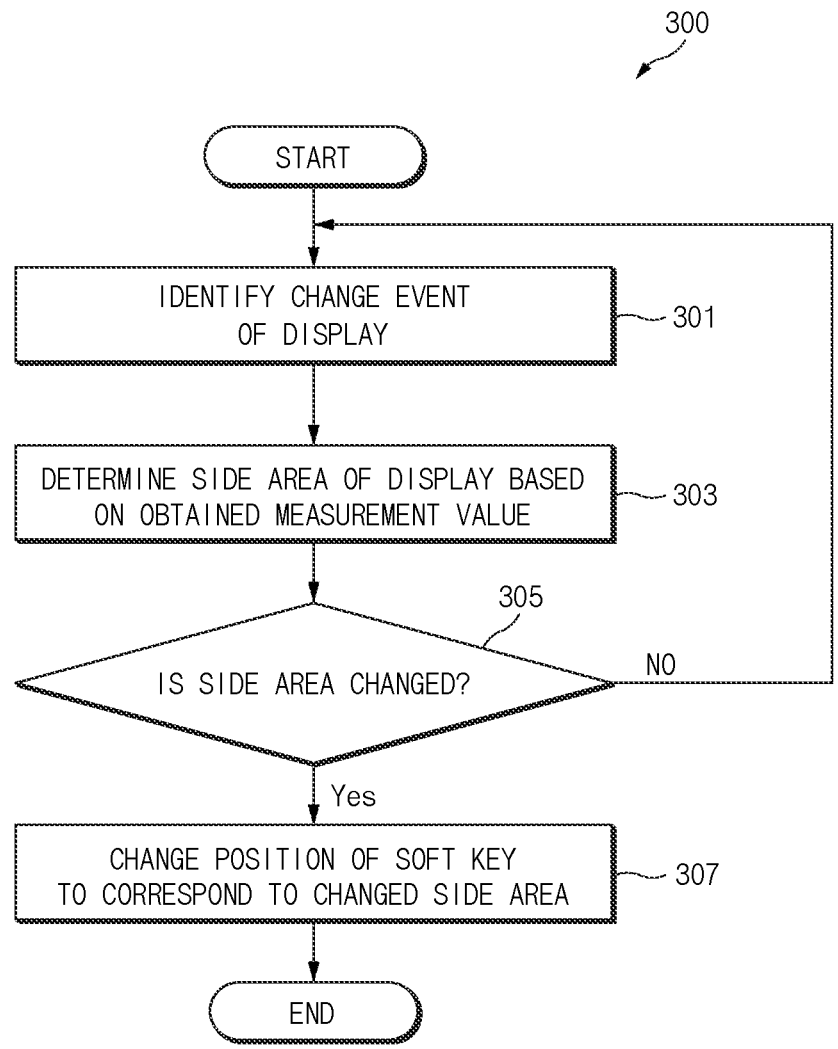
FIG. 3 is a flowchart illustrating an example operation of an electronic device according to various embodiments.

Referring to FIG. 3, in operation 301, an electronic device (e.g., the processor 120 of the electronic device 101 of FIG. 2) may identify a change event of a display (e.g., the display 160 of FIG. 2). According to an embodiment, the change event of the display may refer, for example, to occurrence of a change (expansion, reduction, or change) of a housing in which the display is mounted, and/or occurrence of a change (expansion, reduction, or change) of a display area of the display through the change of the housing. Hereinafter, in the disclosure, identification of a change of the display may include not only identification of a change of the display area of the display itself, but also identification through a change in a housing in which the display is mounted. According to an embodiment, the display change event may refer, for example, to occurrence of a change in the third distance CC.

In operation 303, the processor 120 of the electronic device may determine a side area of the display (e.g., the side area 220 of FIG. 2) based on an obtained measurement value. The description for the side area of the display may be the same as the description with reference to FIG. 2 above. According to an embodiment, the determination of the side area may refer, for example, to determination of an x-axis coordinate (e.g., the third distance CC) of reference coordinate for displaying a soft key.

Figure 4:
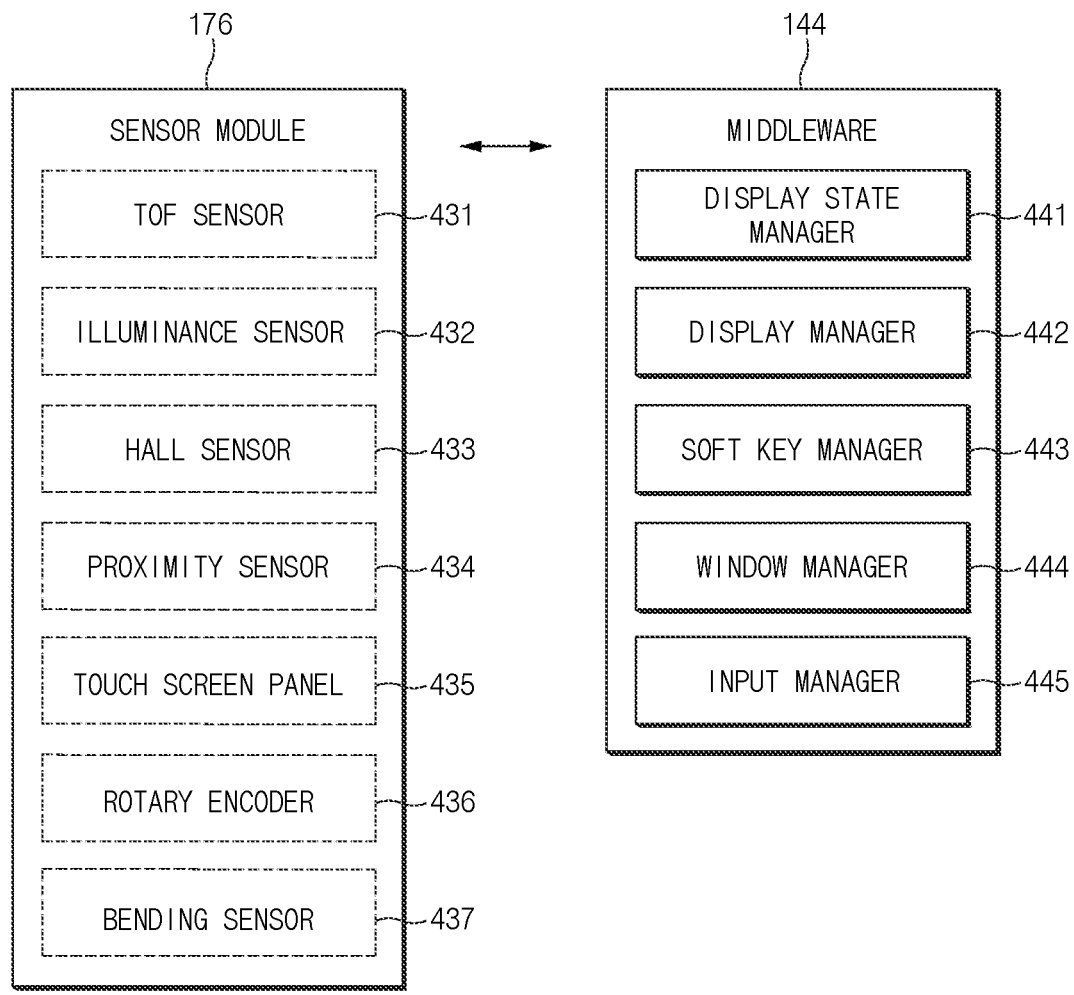
FIG. 4 is a block diagram illustrating an example configuration of an electronic device according to various embodiments.

The processor 120 of the electronic device may first obtain a measurement value from a sensor (e.g., at least one sensor included in the sensor module 176 of FIG. 4) to determine the side area. According to an embodiment, the processor 120 of the electronic device 101 may obtain a measurement value for a display change event through a sensor (e.g., at least one sensor included in the sensor module 176 of FIG. 4). According to an embodiment, the measurement value for the display change event may be a value obtained by directly measuring the third distance CC or a value obtained by measuring the second distance BB to calculate the third distance CC. A method by which the sensor of the electronic device obtains a measurement value for a display change event will be described in detail later with reference to FIG. 4.

The processor 120 of the electronic device may determine a side area based on the obtained measurement value.

In operation 305, the processor 120 of the electronic device may determine whether the calculated side area is changed from an existing side area.

When it is determined that the calculated side area is changed from the existing side area, the processor 120 of the electronic device may change a display position of the soft key to correspond to the changed side area in operation 307.

The processor of the electronic device may determine the third distance CC based on the obtained measurement value and change the reference coordinate of the soft key using the third distance CC as the x-axis coordinate. The processor of the electronic device may display the soft key based on the reference coordinate having the third distance CC as an x-coordinate and the fourth distance DD as a y-coordinate.

According to an embodiment, the processor of the electronic device may change the x-coordinate of the reference coordinate of the soft key as much as the side area is changed. For example, when the side area is moved by "a" in the +x direction, the x-axis coordinate of display coordinates of the soft key may be changed by "+a". In addition, the electronic device may change at least one of a display size and/or a display direction of the soft key to correspond to the changed side area.

The processor of the electronic device may determine the position of a pixel in the x-axis direction by multiplying the third distance CC, which is the x-axis coordinate of the reference coordinate, by a pixel density (or display density). In addition, the processor of the electronic device may determine the position of the pixel in the y-axis direction by multiplying the fourth distance DD, which is the y-axis coordinate of the reference coordinate by the pixel density. The processor of the electronic device may determine the position of the pixel in the x-axis direction by adding a pixel position corresponding to the first distance AA to a value obtained by multiplying the second distance BB by the pixel density. The processor of the electronic device may display the soft key based on the determined pixel position.

Hereinafter, a method of determining a position of the side area 220 of the display 160 of the electronic device 101 will be described in greater detail with reference to FIGS. 2 and 4. The electronic device 101 of FIG. 2 may include the sensor module 176 of FIG. 4 (e.g., the sensor module 176 of FIG. 1) and middleware 144 (e.g., the middleware 144 of FIG. 1). In the disclosure, determining the position of the side area 220 of the display 160 may refer, for example, to determining the x-axis coordinate (e.g., the third distance CC) of the reference coordinate of the soft key.

The sensor module 176 may include at least one of a time-of-flight (ToF) sensor 431, an illuminance sensor 432, a hall sensor 433, a proximity sensor 434, a touch screen panel 435, a rotary encoder 436, and an a bending sensor 437. At least one of sensors included in the sensor module 176 of FIG. 4 may be omitted.

The middleware 144 may include at least one of a display state manager 441, a display manager 442, a soft key manager 443, a window manager 444, and an input manager 445. At least one of modules included in the middleware 144 of FIG. 4 may be omitted.

According to an embodiment, the electronic device 101 may measure the third distance CC using the ToF sensor 431. For example, the ToF sensor 431 may be positioned inside a housing corresponding to the left side 211 of the display 160 of the electronic device 101, and the ToF sensor 431 may emit strong light towards the side area 220 of the display 160. The ToF sensor 431 may measure the third distance CC by detecting light reflected back from the side area 220 (or the housing corresponding to the side area). The ToF sensor 431 may transmit the measurement value to the display state manager 441.

According to an embodiment, the electronic device 101 may measure the third distance CC itself of the display 160 or the second distance BB for calculating the third distance CC using the illuminance sensor 432. For example, the illuminance sensor 432 may be located inside the housing corresponding to the side area 220 of the display 160 of the electronic device 101. Also, for example, the display 160 may include a plurality of micro-configurations that gradually increase or decrease in size along the upper side 212 of the display 160. Therefore, when the position of the side area 220 is changed, the size of a micro-hole corresponding to the side area 220 may be also changed, and the amount of light incident on the illuminance sensor 432 through the micro-hole may also be changed. The illuminance sensor 432 may transmit a measurement value of the amount of incident light to the display state manager 441, and the electronic device 101 (e.g., the display state manager 441) may calculate the third distance CC itself or the position of the second distance BB for calculating the third distance CC based on the measurement value of the amount of light.

For example, in the case of the electronic device 101 in which a part of the display 160 is embedded in the housing 210 of the electronic device 101, and the embedded part is exposed to the outside of the housing 210 of the electronic device 101 when the display 160 is expanded, the illuminance sensor 432 may be located in a portion of the display 160 embedded in the housing 210 to measure the amount of light incident on the illuminance sensor 432 when the illuminance sensor 432 is exposed to the outside. The illuminance sensor 432 may transmit a measurement value of the amount of incident light to the display state manager 441, and the electronic device 101 (e.g., the display state manager 441) may determine an area of the display 160 currently exposed to the outside of the housing 210 based on the measurement value of the amount of light. The electronic device 101 may calculate the third distance CC or the second distance BB based on a value obtained by determining the area of the display 160 currently exposed to the outside of the housing 210.

According to an embodiment, the electronic device 101 may measure the third distance CC itself of the display 160 or the second distance BB for calculating the third distance CC using the hall sensor 433. For example, a magnet may be located inside the housing 210 corresponding to the side area 220 of the display 160 of the electronic device 101, and the hall sensor 433 may be located on the leftmost side of the housing 210 corresponding to the position of the magnet. The hall sensor 433 may measure a magnetic force of the magnet and transmit a measurement value to the display state manager 441, and the display state manager 441 may calculate a current position of the housing 210 based on the measurement value of the magnetic force. The display state manager 441 may calculate the area of the display 160 exposed to the outside based on the calculated position of the housing 210.

According to an embodiment, the electronic device 101 may measure the third distance CC itself of the display 160 or the second distance BB for calculating the third distance CC using the proximity sensor 434. For example, the electronic device 101 may be an electronic device in which a part of the display 160 may be embedded in the housing 210 of the electronic device 101, and the embedded part is exposed to the outside of the housing 210 of the electronic device 101 when the display 160 is expanded. In this case, the electronic device 101 may include a plurality of proximity sensors 434 in a portion under an area in which the display 160 is to be embedded inside the housing 210. According to an embodiment, the plurality of proximity sensors 434 may be located in a line along a direction in which the display 160 is expanded (e.g., the x-axis direction). When a part of the display 160 is exposed to the outside of the housing 210, an adjacent object (housing) which has been detected by the proximity sensor 434 may not be detected, and depending on the degree of expansion of the display 160, some of the plurality of proximity sensors 434 may detect the adjacent object (housing), and some may not detect the adjacent object (housing). The plurality of proximity sensors 434 may transmit a measurement value of the adjacent object to the display state manager 441, and the display state manager 441 may calculate an area of the display 160 currently exposed to the outside of the housing 210 based on the received measurement value. The electronic device 101 may calculate the area of the display 160 currently exposed to the outside of the housing 210 based on the adjacent object detection results from the plurality of proximity sensors 434, and calculate the third distance CC or the second distance BB of the display 160 based on the calculated value.

According to an embodiment, the electronic device 101 may measure the third distance CC itself of the display 160 or the second distance BB for calculating the third distance CC using the touch screen panel 435. The electronic device 101 may include the touch screen panel 435 corresponding to a front surface of the display 160. For example, in the case of the electronic device 101 in which a part of the display 160 is embedded in the housing 210 of the electronic device 101, and the embedded part is exposed to the outside of the housing 210 of the electronic device 101 when the display 160 is expanded, a hovering event may occur due to the housing 210 in the embedded part of the display 160 when the part of the display 160 that has been exposed to the outside of the housing 210 is embedded into the housing 210 again. In this case, to distinguish the hovering event from a hovering event caused by a user's finger, the touch screen panel 435 may generate a hovering event in a line in the y-axis direction. The touch screen panel 435 may transmit coordinates at which the hovering event occurs to the display state manager 441, and the display state manager 441 may calculate an area of the display 160 currently exposed to the outside of the housing 210 based on the coordinates. The display state manager 441 may calculate the third distance CC or the second distance BB based on a value obtained by calculating the area of the display 160 currently exposed to the outside of the housing 210.

According to an embodiment, the electronic device 101 may measure the third distance CC itself of the display 160 or the second distance BB for calculating the third distance CC using the rotary encoder 436. For example, in the case of the electronic device 101 in which a part of the display 160 is rolled on the rotary encoder 436 and the display 160 is expanded when the rolled part is unfolded for expansion of the display 160, the electronic device 101 may calculate a currently unfolded area of the display 160 based on the amount of rotation of the rotary encoder 436. The rotary encoder 436 may transmit the amount of rotation to the display state manager 441, and the display state manager 441 may calculate a currently expanded area of the display 160 based on the received amount of rotation of the encoder 436 and calculate the third distance CC or the second distance BB based on the calculated area.

According to an embodiment, the electronic device 101 may measure the third distance CC itself of the display 160 or the second distance BB for calculating the third distance CC using the bending sensor 437. For example, the bending sensor 437 may be included under the display 160 in the x-axis direction. In the case of the electronic device 101 in which the display 160 is bent and reduced, the bending sensor 437 may transmit a position at which bending is detected to the display state manager 441, and the display state manager 441 may calculate the third distance CC itself or the second distance BB for calculating the third distance CC based on a received measurement value.

At least one sensor of the sensor module 176 may transmit a value measured by the sensor to the display state manager 441. The display state manager 441 may obtain the third distance CC of the display 160 based on the received measurement value. The display state manager 441 may directly obtain the third distance CC based on the received measurement value or obtain the third distance CC by obtaining the second distance BB based on the received measurement value and adding the first distance AA to the second distance BB. The display state manager 441 may transmit the obtained third distance CC to the display manager 442. Also, the display state manager 441 may transmit the obtained third distance CC to the soft key manager 443.

The display manager 442 may map logical coordinates of a display, which is to output a graphical user interface (GUI), to physical coordinates of an actual display. According to an embodiment, a reference coordinate having the third distance CC as an x-axis coordinate indicating the physical size of the display 160 and the fourth distance DD as a y-axis coordinate may be referred to as physical coordinates, and pixel coordinates indicating a position of a pixel for displaying a graphical user interface (GUI) among a plurality of pixels included in the display 160 may be referred to as logical coordinates.

The display manager 442 may change the third distance CC received from the display state manager 441 into logical coordinates. According to an embodiment, the display manager 442 may determine the position of a pixel in the x-axis direction by multiplying the third distance CC, which is the x-axis coordinate of the reference coordinate, by a pixel density (or display density). Alternatively, the display manager 442 may determine a pixel position in the x-axis direction by adding a pixel position corresponding to the first distance AA to a value obtained by multiplying the second distance BB by the pixel density.

The soft key manager 443 may change pixel coordinates (e.g., logical coordinates) of the soft key 230 to correspond to the pixel position determined by the display manager 442. The soft key manager 443 may transmit pixel coordinates (e.g., logical coordinates) of the soft key to the window manager 444.

The window manager 444 may manage one or more graphic user interface (GUI) resources used on a screen, and display the soft key 230 on the display 160 based on the pixel coordinates (e.g., logical coordinates) received from the soft key manager 443.

Hereinafter, an electronic device according to an embodiment will be described in greater detail below with reference to FIGS. 4 and 5.

Figure 5:
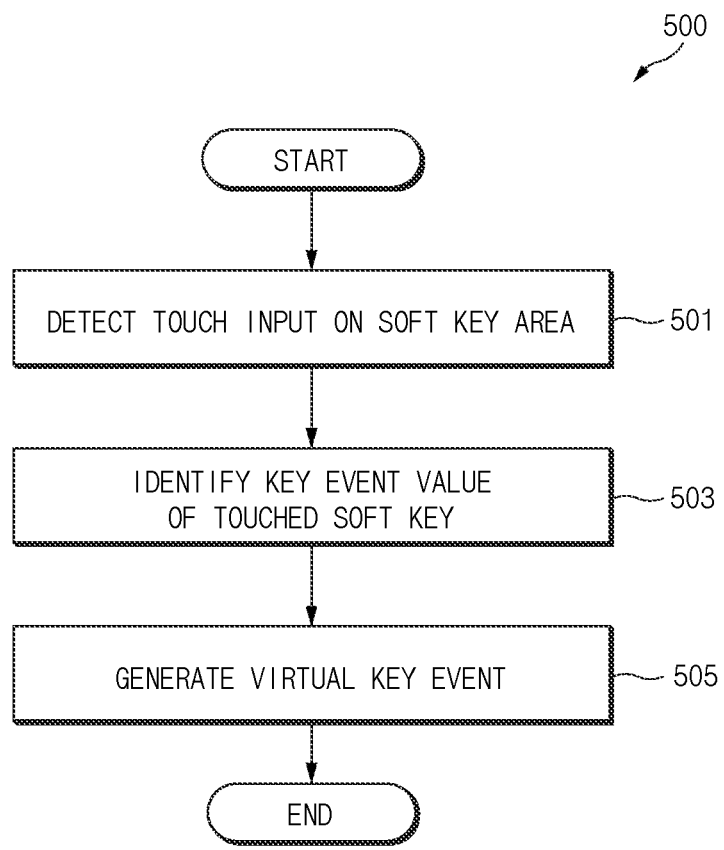
FIG. 5 is a flowchart illustrating an example operation of an electronic device according to various embodiments.

FIG. 5 is a flowchart (500) illustrating an example operation of an electronic device according to various embodiments.

Referring to FIGS. 4 and 5, in operation 501, the processor 120 of the electronic device may detect a user's touch input on a soft key area. For example, the electronic device may detect a user's input for a soft key through the touch screen panel 435. Because the display position of the soft key is changed as the side area of the display is changed, the coordinates at which the touch input is identified may vary according to a state of the display even for the same soft key (e.g., a home key). The sensor module 176 may transmit input coordinates for the soft key to the soft key manager 443.

In operation 503, the processor 120 of the electronic device may identify a key event value of the touched soft key. The soft key manager 443 may store a key event value corresponding to at least one soft key. The soft key manager 443 may identify a key event value corresponding to the touched soft key based on the input coordinates for the soft key which are received from the sensor module 176. The soft key manager 443 may transmit the identified key event value to the input manager 445. According to an embodiment, the key event value corresponding to the soft key may be changeable by a user's settings.

In operation 505, the processor 120 of the electronic device may generate a virtual key event. The input manager 445 may generate a virtual key event for the soft key in the same way that a physical key is pressed, based on the received key event value. The electronic device may perform an operation corresponding to the touched soft key by executing the virtual key event. Also, according to an embodiment, the electronic device may provide sound or haptic feedback as the soft key is touched.

Hereinafter, an electronic device according to an embodiment will be described in greater detail below with reference to FIG. 6.

Figure 6:
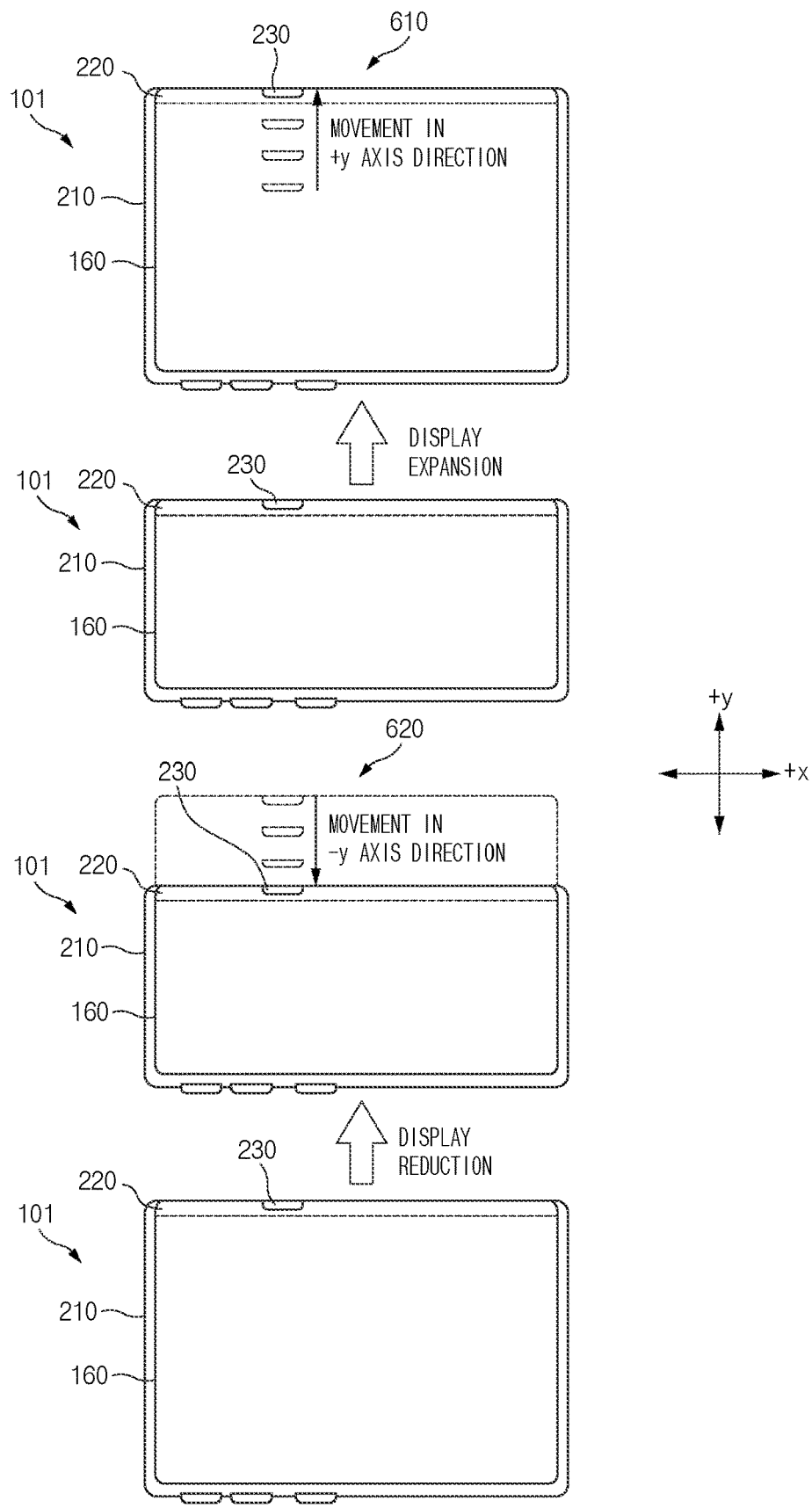
FIG. 6 is a diagram illustrating various states of an electronic device according to various embodiments.

FIG. 6 is a diagram illustrating various views (610, 620) showing an electronic device according to various embodiments. The same or similar components as those of the above-described embodiment may be referred to by the same reference numerals, and a description thereof may not be repeated here.

Referring to FIG. 6, the electronic device 101 (e.g., the electronic device 101 of FIG. 1) may include the housing 210 including a body of the electronic device 101 and the display 160 coupled to the housing 210 (e.g., the display module 160 of FIG. 1). The display 160 may include the side area 220 corresponding to one side which is being bent to cover an outer surface of the housing 210 among four sides.

The display 160 may be a variable display in which a position of the side area 220 of the entire screen is variable.

When the electronic device 101 shown in FIG. 2 is in a portrait mode in which a length in the vertical direction (y-axis direction) is longer than a length in the horizontal direction (x-axis direction), the electronic device 101 may expanded/reduce the display 160 in a landscape mode in which the length in the horizontal direction (x-axis direction) is longer than the length in the vertical direction (y-axis direction).

Referring to the first case 610 of FIG. 6, in the landscape mode, the side area 220 may be moved in the +y-axis direction on the entire screen of the display 160 as the display area of the display 160 is expanded in the +y-axis direction. When the side area 220 of the display 160 is moved by "a" in the +y-axis direction, the electronic device 101 may change the y-axis coordinate of the reference coordinate of the soft key 230 by "+a", and display the soft key 230 by changing the pixel coordinates according to the changed reference coordinate.

Referring to the second case 620 of FIG. 6, in the landscape mode, the side area 220 may be moved in the −y-axis direction on the entire screen of the display 160 as the display area of the display 160 is reduced in the −y-axis direction. When the side area 220 of the display 160 is moved by "a" in the −y-axis direction, the electronic device 101 may change the y-axis coordinate of the display coordinates of the soft key 230 by "−a", and display the soft key 230 by changing the pixel coordinates according to the changed reference coordinate.

Hereinafter, an operation of the electronic device according to an embodiment will be described in greater detail below with reference to FIGS. 7 and 8.

Figure 7:
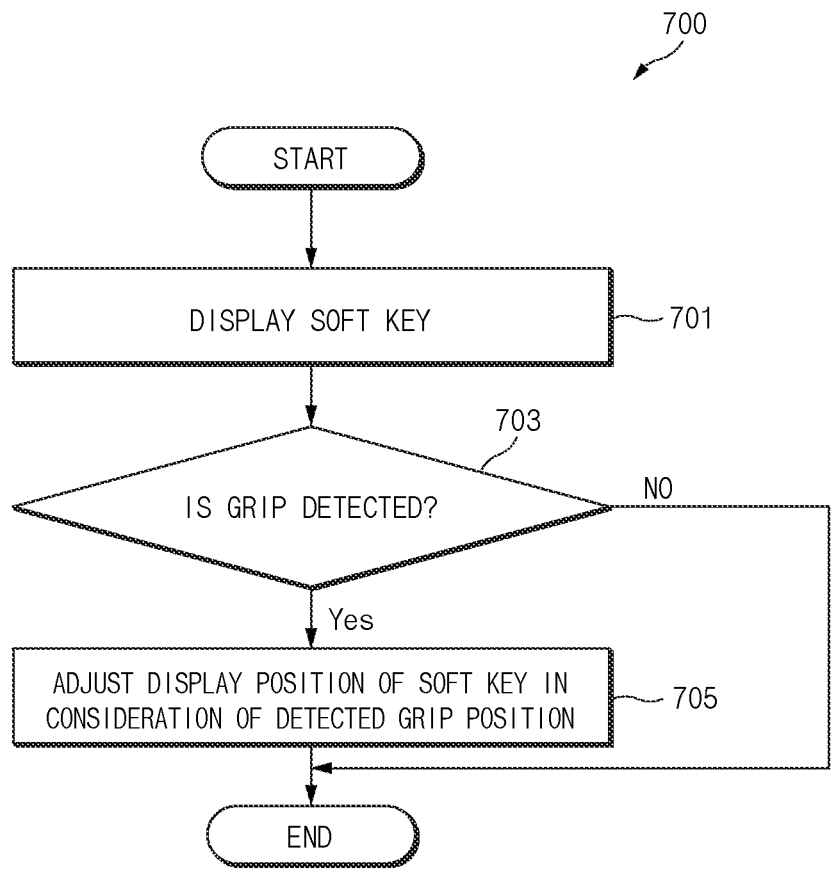
FIG. 7 is a flowchart illustrating an example operation of an electronic device according to various embodiments.

FIG. 7 is a flowchart (300) illustrating an example operation of an electronic device according to various embodiments. FIG. 8 is a diagram illustrating various views (810, 820) illustrating an electronic device according to various embodiments. The same or similar components as those of the above-described embodiment may be referred to by the same reference numerals, and a description thereof may not be repeated here.

Figure 8:
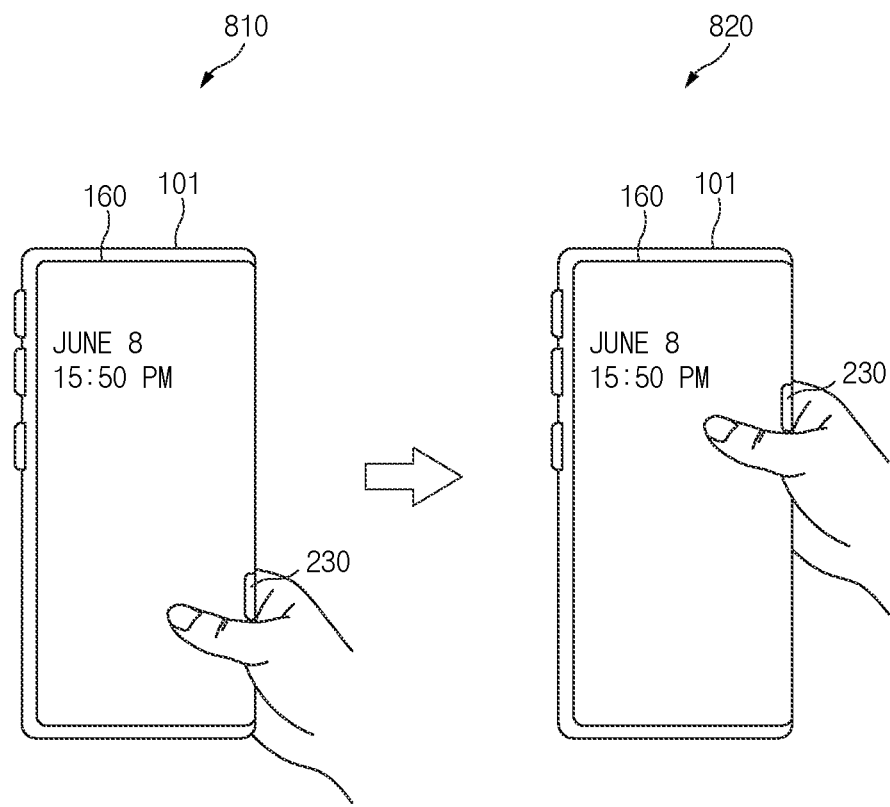
FIG. 8 is a diagram illustrating an electronic device according to various embodiments.

Referring to FIGS. 7 and 8, in operation 701, the processor 120 of the electronic device 101 may display the soft key 230. A method of determining pixel coordinates for displaying the soft key 230 may be the same as the method described above with reference to FIGS. 2 to 4.

In operation 703, the processor 120 of the electronic device 101 may detect a grip on the electronic device 101. The electronic device 101 may further include a grip sensor (not shown), and may detect a grip and a grip position with respect to the electronic device 101 through the grip sensor.

In operation 705, the processor 120 of the electronic device 101 may adjust the display position of the soft key in consideration of (e.g., based on) the detected grip position. For example, when the user's grip position is changed from a first state 810 to a second state 820 of FIG. 8, the electronic device 101 may change the y-axis coordinate of the reference coordinate of the soft key 230 (e.g., fourth distance DD) to correspond to the grip position. According to an embodiment, the electronic device 101 may display the soft key 230 at a position where the user is able to easily touch the soft key 230, based on the grip position. For example, the electronic device 101 displays the soft key 230 by changing the y-axis coordinate (e.g., fourth distance DD) of the reference coordinate by a specified interval (e.g., 2 cm to the top) from coordinates where the grip is detected.

Hereinafter, an example operation of the electronic device according to an example embodiment will be described in greater detail below with reference to FIGS. 9 and 10.

Figure 9:
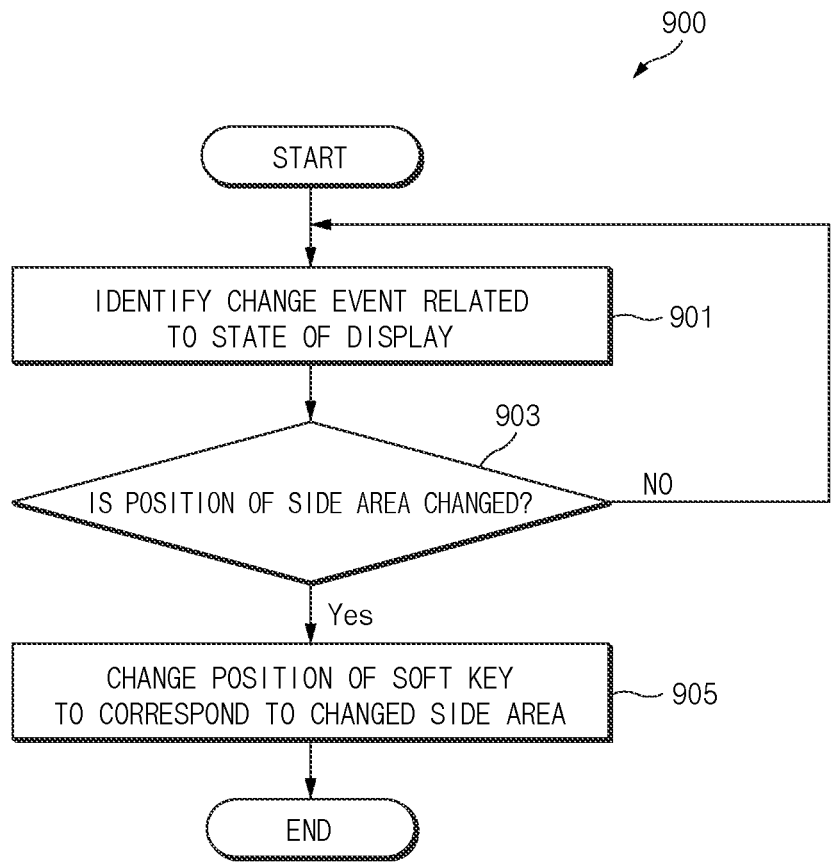
FIG. 9 is a flowchart illustrating an example operation of an electronic device according to various embodiments.

FIG. 9 is a flowchart (900) illustrating an example operation of an electronic device according to various embodiments. FIG. 10 is a diagram illustrating various views (1010, 1020) showing an electronic device according to various embodiments.

Figure 10:
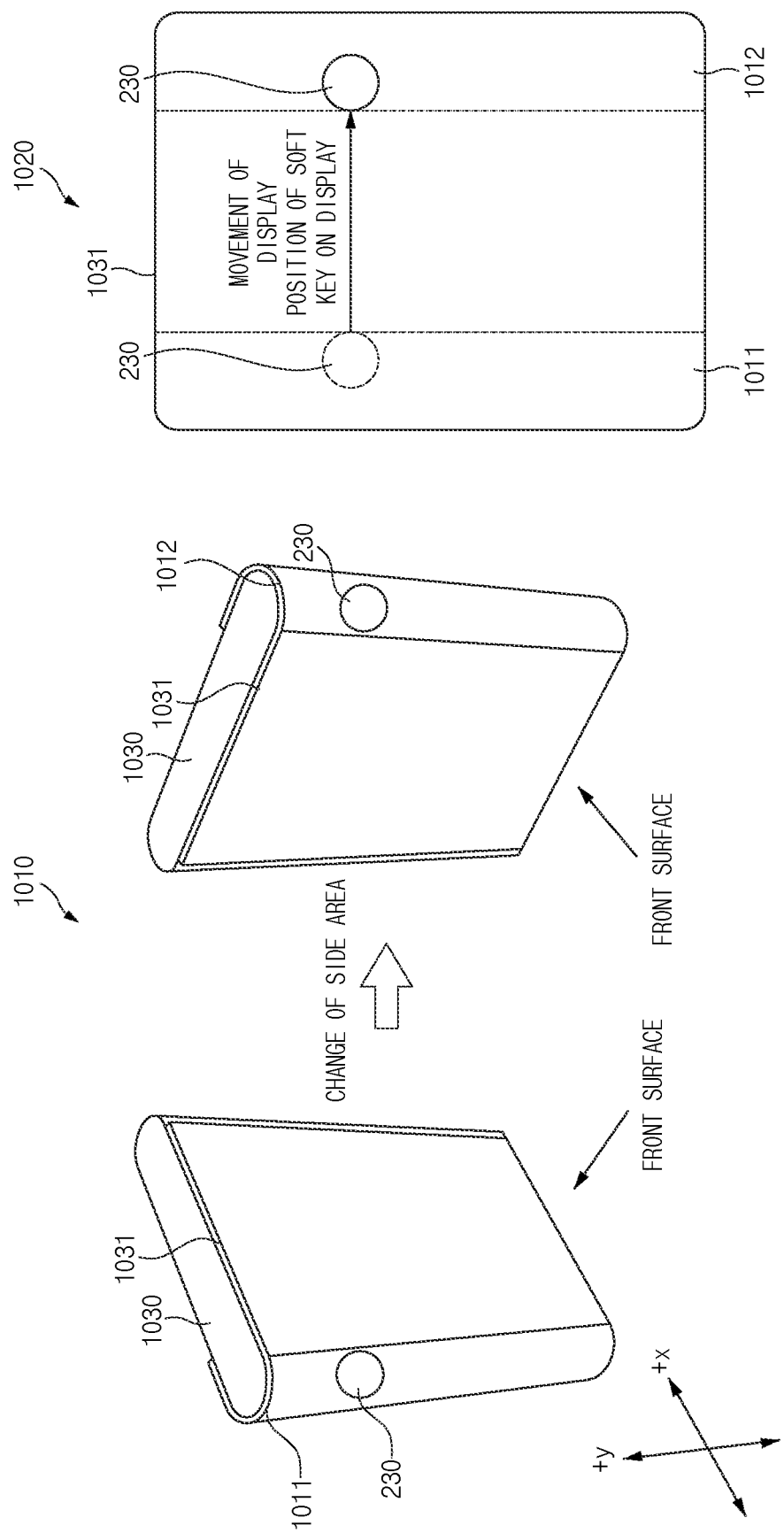
FIG. 10 is a diagram illustrating an electronic device according to various embodiments.

Referring to FIGS. 9 and 10, in operation 901, the processor (e.g., the processor 120 of FIG. 2) of an electronic device 1030 (e.g., the electronic device 101 of FIG. 1) may identify a state change event of a display 1031 (e.g., the display 160 of FIG. 1). The display 1031 of the electronic device 1030 may be a variable display in which a front area and a side area of the display are variable. Referring to the first view 1010 of FIG. 10, for example, when a surface including a gaze area at which a user gazes is defined as a front surface of the electronic device 101, the display 160 may be slidable in the +x-axis or −x-axis direction, and as the display 160 slides, the front area and the side area may be changed. For example, when the display 1031 slides to the end in the +x-axis direction, the first area 1011 may belong to the front area, the second area 1012 may be the side area, and when the display 1031 slides to the end in the −x-axis direction, the second area 1012 may belong to the front area and the first area 1011 may be the side area.

In operation 903, the processor of the electronic device 1030 may determine whether the position of the side area is changed. Referring to the first view 1010 of FIG. 10, according to an embodiment, the processor of the electronic device 1030 may determine whether the side area of the display 160 is changed from the first area 1011 to the second area 1012 as the display 160 slides in the +x-axis direction with respect to the front surface. The definition of the side area of the display 160 may be the same as in the embodiment described above with reference to FIG. 2. Referring to the second view 1020 of FIG. 10, the processor of the electronic device 1030 may identify that the side area in the entire screen of the display 160 has been moved from the first area 1011 to the second area 1012, for example, from the left to the right as the display 160 slides in the +x-axis direction with respect to the front surface.

In operation 905, the processor 120 of the electronic device 101 may change a display position of the soft key 230 to correspond to the changed position of the side area of the display 160 when it is determined in operation 903 that the position of the side area has changed. Referring to the first view 1010 and the second view 1020 of FIG. 10, the electronic device 101 may move the soft key 230 which has been displayed in the first area 1011 to be displayed in the second area 1011 as the side area of the display 160 is changed from the first area 1011 to the second area 1012. In addition, the electronic device 101 may change at least one of a display size or a display direction of the soft key 230 to correspond to the changed side area.

Hereinafter, an example operation of the electronic device according to an example embodiment will be described in greater detail below with reference to FIGS. 11 and 12.

Figure 11:
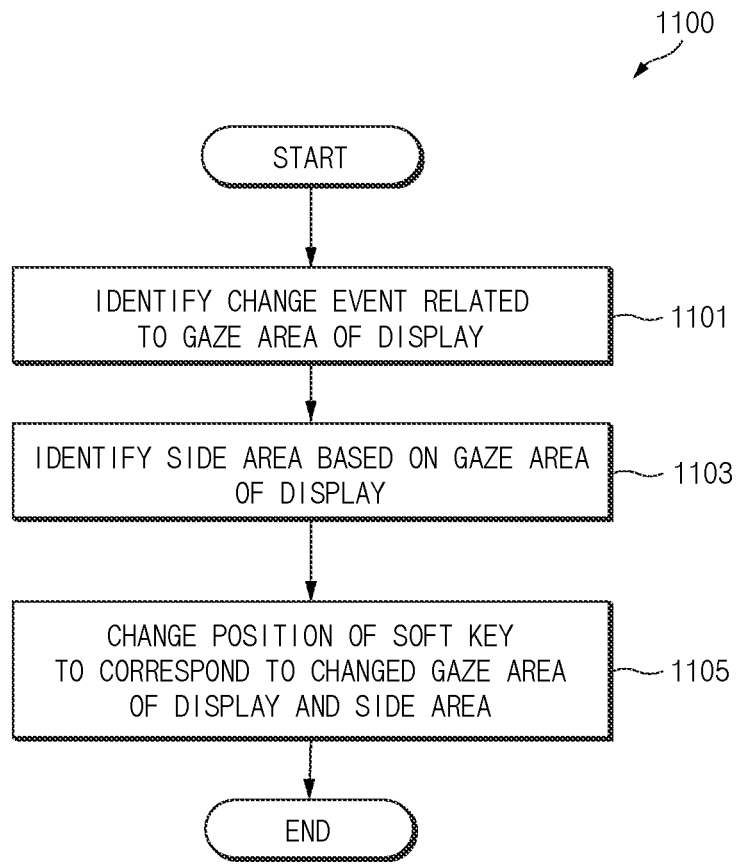
FIG. 11 is a flowchart illustrating an example operation of an electronic device according to various embodiments.

FIG. 11 is a flowchart (1100) illustrating an example operation of an electronic device according to various embodiments. FIG. 12 is a diagram illustrating various views (1210, 1220) of an electronic device according to various embodiments. The same or similar components as those of the above-described embodiment may be referred to by the same reference numerals, and a description thereof may not be repeated here.

Figure 12:
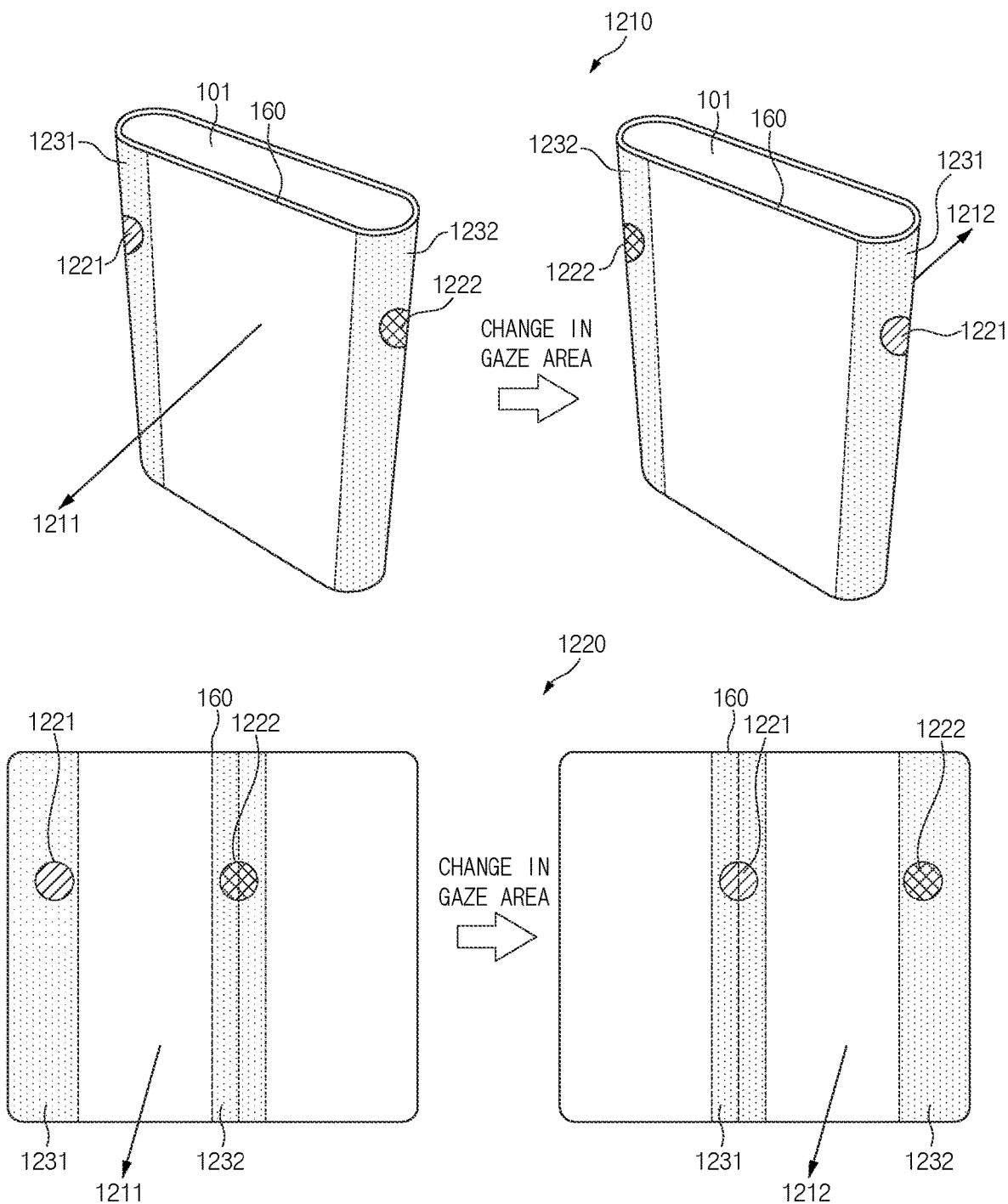
FIG. 12 is a diagram illustrating an electronic device according to various embodiments.

Referring to FIGS. 11 and 12, in operation 1101, the processor 120 of the electronic device 101 may identify an event related to the change of the gaze area of the display 160. Referring to the first view 1210 of FIG. 12, the display 160 of the electronic device 101 may completely surround the electronic device 101 or at least cover the front and rear surfaces of the electronic device 101. As shown in the first view 1210 of FIG. 12, the gaze area of the electronic device 101 may be changed from the first area 1211 to the second area 1212 depending on whether a surface at which a user gazes is the front surface or rear surface of the electronic device 101. According to an embodiment, the gaze area of the electronic device 101 may be identified through a grip sensor (detection of the user's grip direction), an iris sensor (detection of the user's iris), or a face recognition sensor (detection of the user's face) which is built in the electronic device 101.

In operation 1103, the processor 120 of the electronic device 101 may identify a side area based on the gaze area of the display 160. Referring to the first view 1210 of FIG. 12, when the gaze area of the electronic device 101 is a first area 1211, the first side area 1231 may be positioned on the left side of the first area 1211 and the second side area 1232 may be positioned on the right side of the first area 1211. When the gaze area of the electronic device 101 is changed to the second area 1212, the first side area 1231 may be positioned on the left side of the second area 1212 and the second side area 1232 may be positioned on the right side of the second area 1212. The second view 1220 of FIG. 12 is a view showing only the entire screen of the display 160 of the electronic device, in which when the gaze area of the electronic device 101 is the first area 1211, the first side area 1231 may be positioned on the left side of the first area 1211 and the second side area 1232 may be positioned on the right side of the first area 1211, and when the gaze area of the electronic device 101 is changed to the second area 1212, the first side area 1231 may be positioned on the left side of the second area 1212 and the second side area 1232 may be positioned on the right side of the second area 1212.

In operation 1105, the processor 120 of the electronic device 101 may change a position of the soft key to correspond to the changed gaze area and side area of the display. Referring to the first view 1210 and the second view 1220 of FIG. 12, the electronic device 101 may display a first soft key 1221 on the first side area 1231 on the left of the first area 1211 acting as a reference and display a second soft key 1222 on the second side area 1232 on the right of the first area 1211 acting as a reference, when the gaze area of the electronic device 101 is the first area 1211. When the gaze area of the electronic device 101 is changed to the second area 1212, the electronic device 101 may display the first soft key 1221 on the first side area 1231 on the left of the second area 1212 acting as a reference and display the second soft key 1222 on the second side area 1232 on the right of the second area 1212 acting as a reference.

Hereinafter, an example operation of the electronic device according to an example embodiment will be described in greater detail below with reference to FIGS. 13, 14, and 15.

Figure 13:
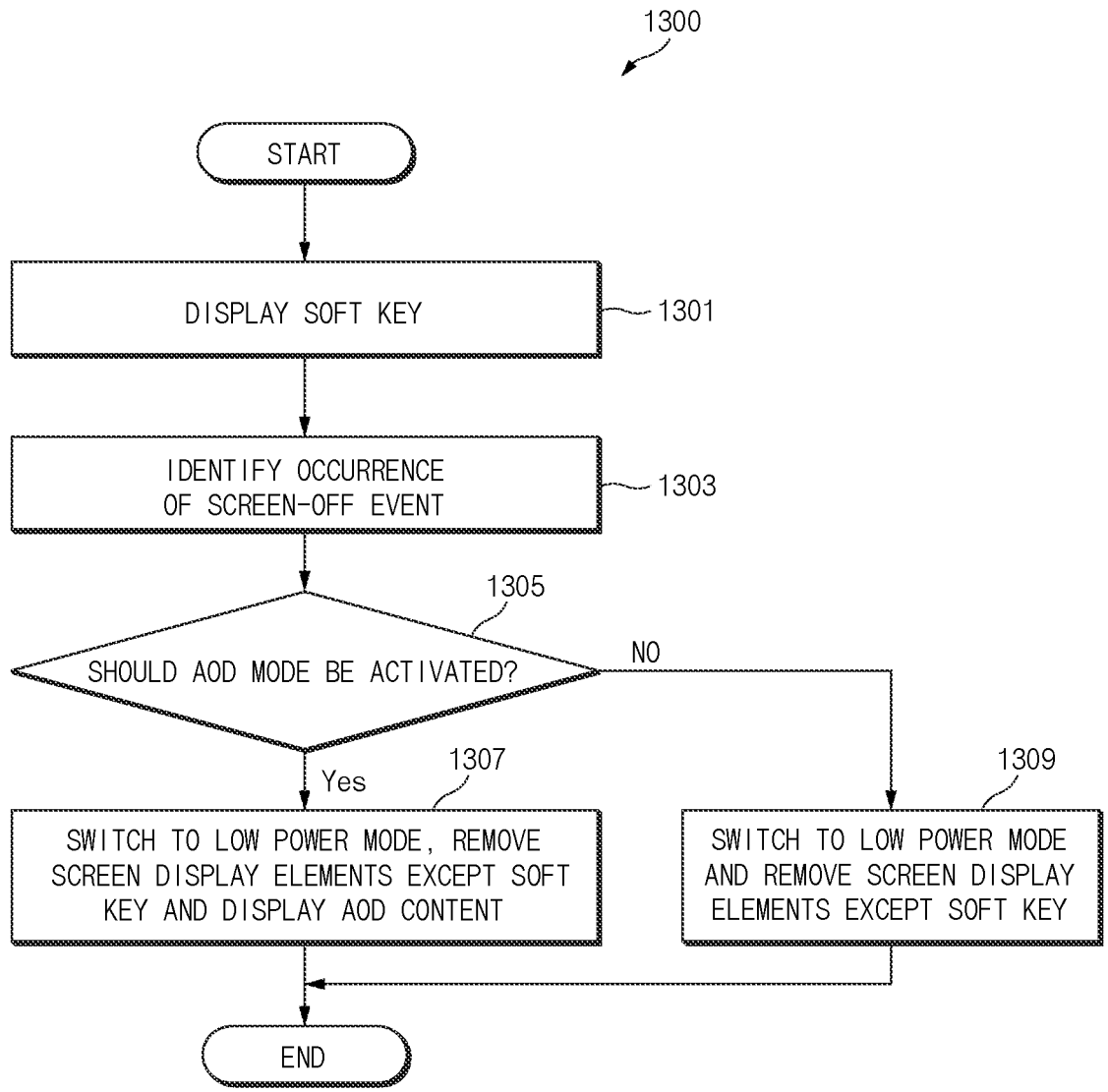
FIG. 13 is a flowchart illustrating an example operation of an electronic device according to various embodiments.

FIG. 13 is a flowchart (1300) illustrating an example operation of an electronic device according to various embodiments. FIG. 14 is a diagram illustrating various views (1410, 1420) of an electronic device according to various embodiments. FIG. 15 is a diagram illustrating various views (1510, 1520) of an electronic device according to various embodiments. The same or similar components as those of the above-described embodiment may be referred to by the same reference numerals, and a description thereof may not be repeated here.

Referring to FIG. 13, in operation 1301, the processor 120 of the electronic device may display a soft key on a display. A method of calculating display coordinates of a soft key may be the same as or similar to the embodiment described above with reference to FIGS. 2 to 4.

In operation 1303, the processor 120 of the electronic device may identify occurrence of a screen-off event. According to an embodiment, the screen-off event may occur by any one of press of a physical key, touch of a soft key, input of a gesture corresponding to screen-off, request of screen-off by an application, or lapse of a predetermined time without a user's input.

In operation 1305, after identifying the occurrence of the screen-off event, the processor 120 of the electronic device may determine whether to activate an always on display (AOD) mode for displaying a user interface such as date, clock, and missed contact even in a low power mode. Whether to activate the AOD mode when the screen is turned off may be set by at least one of a design of the electronic device or user settings. The AOD mode is an example of a low-power technology and the AOD mode may be a mode in which AOD content is displayed on the display in response to a request of screen-off, but the display's backlight is restricted to use minimal or no power to display AOD content. In addition, in the AOD mode, the electronic device may stop the operation of a system resource such as a CPU (e.g., the processor 120 in FIG. 1), activate a system operation only for a certain time at certain cycles to refresh a screen, and then stop the operation of the system resource again.

When it is determined not to activate the AOD mode, in operation 1309, the electronic device may remove screen display elements except for the soft key while switching to the low power mode. According to an embodiment, in the low power mode, the electronic device may perform at least one of stopping access to a network, limiting the operation of a CPU clock or an active core, stopping searching for Wi-Fi in a system, ignoring a wake request in the system, delaying a part of an AlarmManager event a certain time from a requested cycle, disabling synchronization execution in the system, and disabling the execution of JobScheduler in the system.

When it is determined to activate the AOD mode, in operation 1307, the electronic device may remove screen display elements except for the soft key and display AOD content (e.g., date, time, missed contact) while switching to the low power mode.

Figure 14:
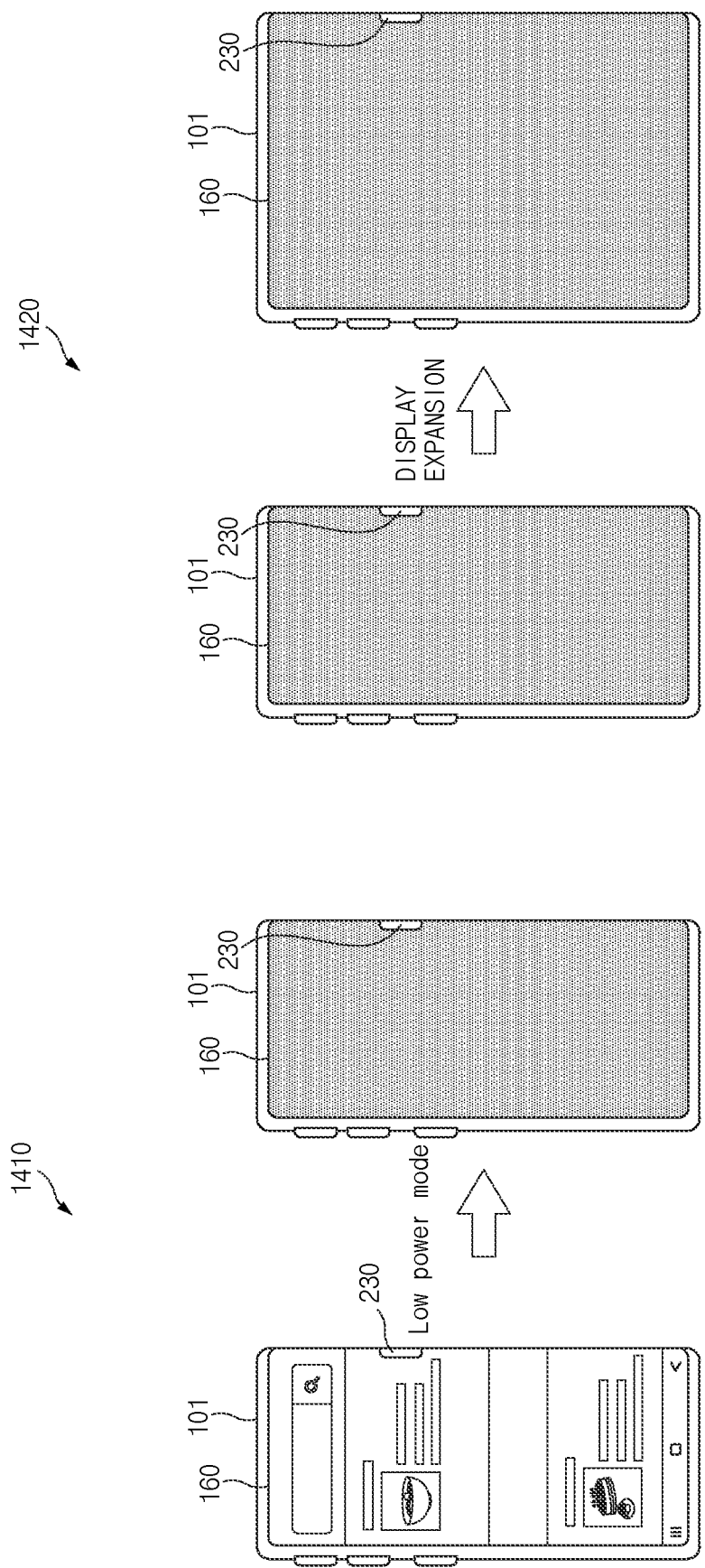
FIG. 14 is a diagram illustrating an electronic device according to various embodiments.

Referring to the first view 1410 of FIG. 14, the electronic device 101 may display various content and the soft key 230 on the display 160 when the screen is turned on. When identifying the occurrence of a screen-off event and determining not to activate the AOD mode, the electronic device 101 may switch to the low power mode and remove all displayed content on the screen except for the soft key 230. The electronic device 101 may still display the soft key 230 even in the low power mode.

Referring to the second view 1420 of FIG. 14, even when the display 160 is expanded in the low power mode, the electronic device 101 may change the display position of the soft key 230 according to the changed position of the side area. A method of calculating display coordinates of the soft key 230 in the low power mode of the electronic device 101 may be the same as the method described above with reference to FIGS. 2, 3 and 4.

Figure 15:
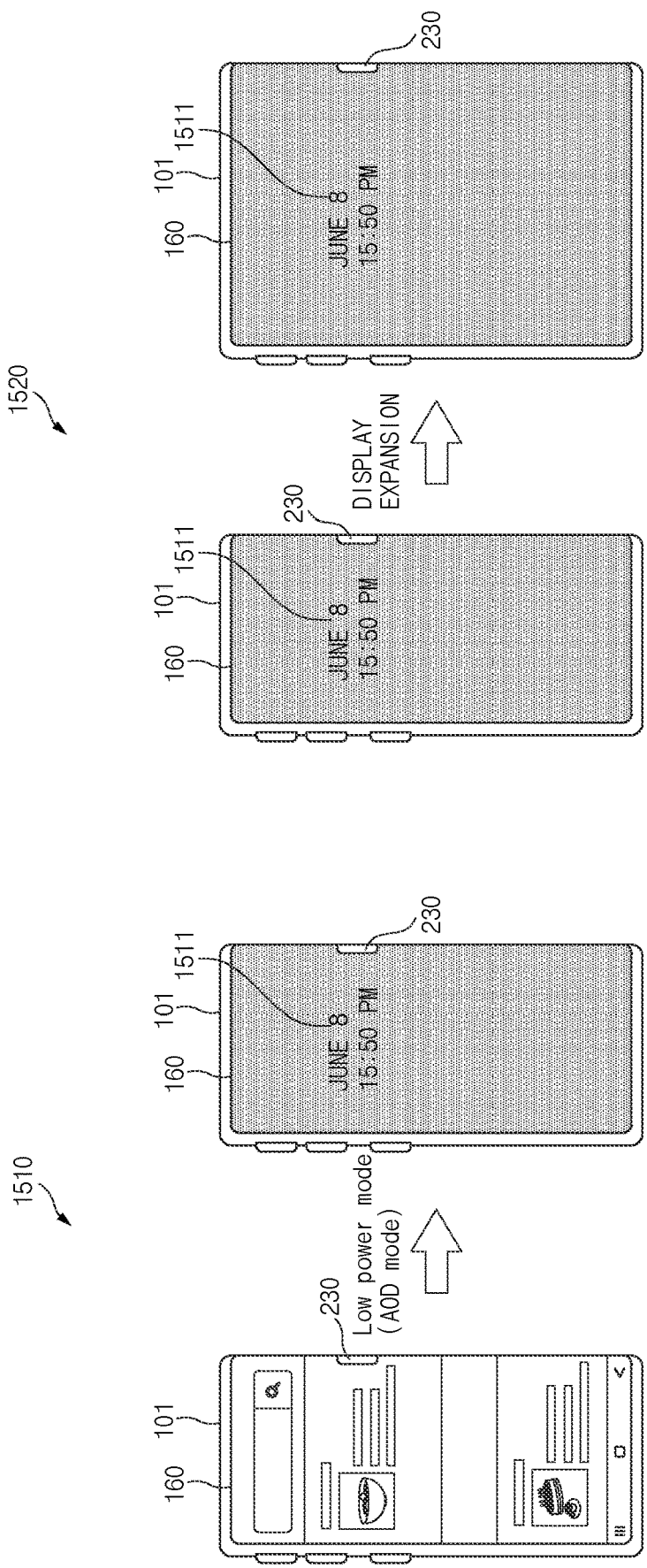
FIG. 15 is a diagram illustrating an electronic device according to various embodiments.

Referring to the first view 1510 of FIG. 15, the electronic device 101 may display various content and the soft key 230 on the display 160 when the screen is turned on. When identifying the occurrence of a screen-off event and determining to activate the AOD mode, the electronic device 101 may switch to the low power mode, remove all displayed content on the screen except for the soft key 230, and display an AOD content 1511. The electronic device 101 may still display the soft key 230 in the low power mode and the AOD mode.

Referring to the second view 1520 of FIG. 15, even when the display 160 is expanded in the low power mode and the AOD mode, the electronic device 101 may change the display position of the soft key 230 according to the changed position of the side area. A method of calculating display coordinates of the soft key 230 in the low power mode and the AOD mode of the electronic device 101 may be the same as or similar to the method described above with reference to FIGS. 2, 3 and 4.

Figure 17:
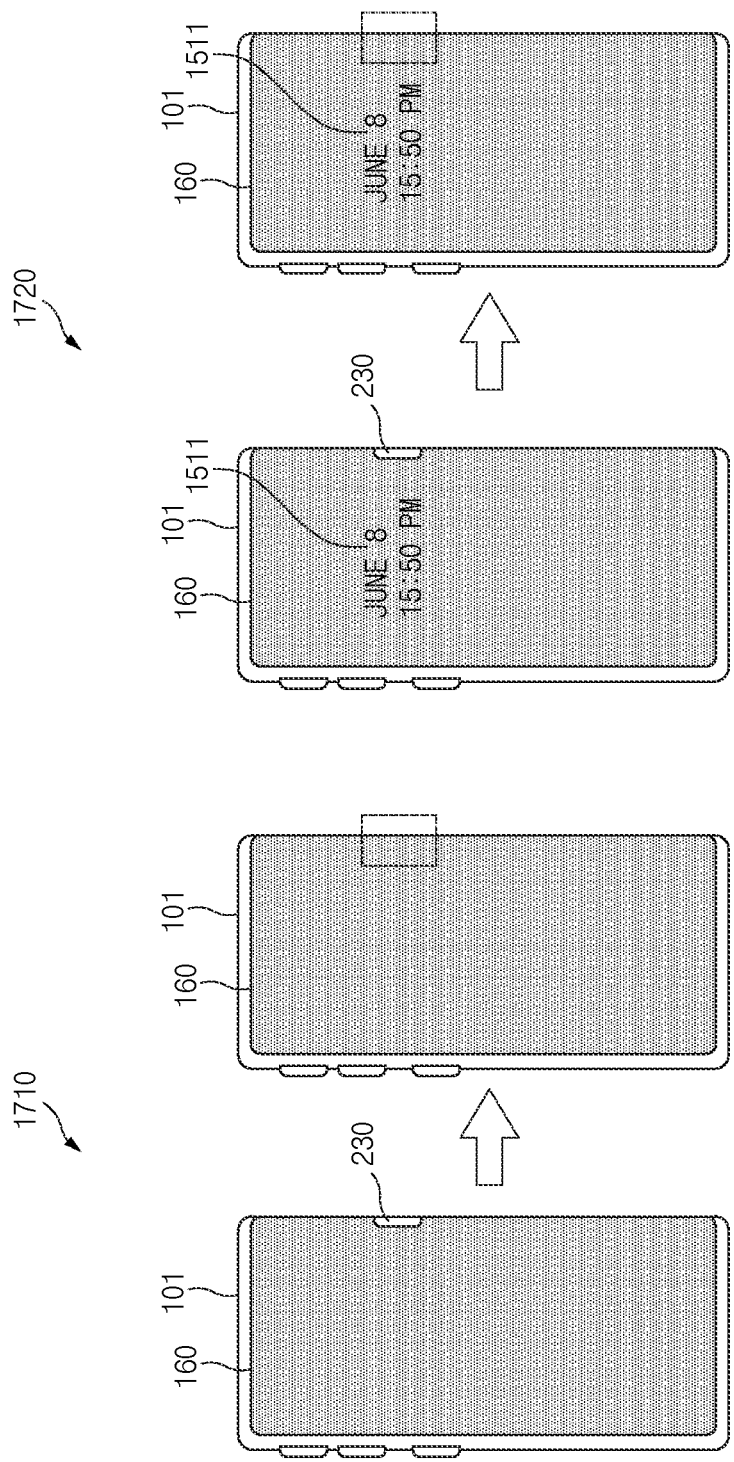
FIG. 17 is a diagram illustrating an electronic device according to various embodiments.
Figure 18:
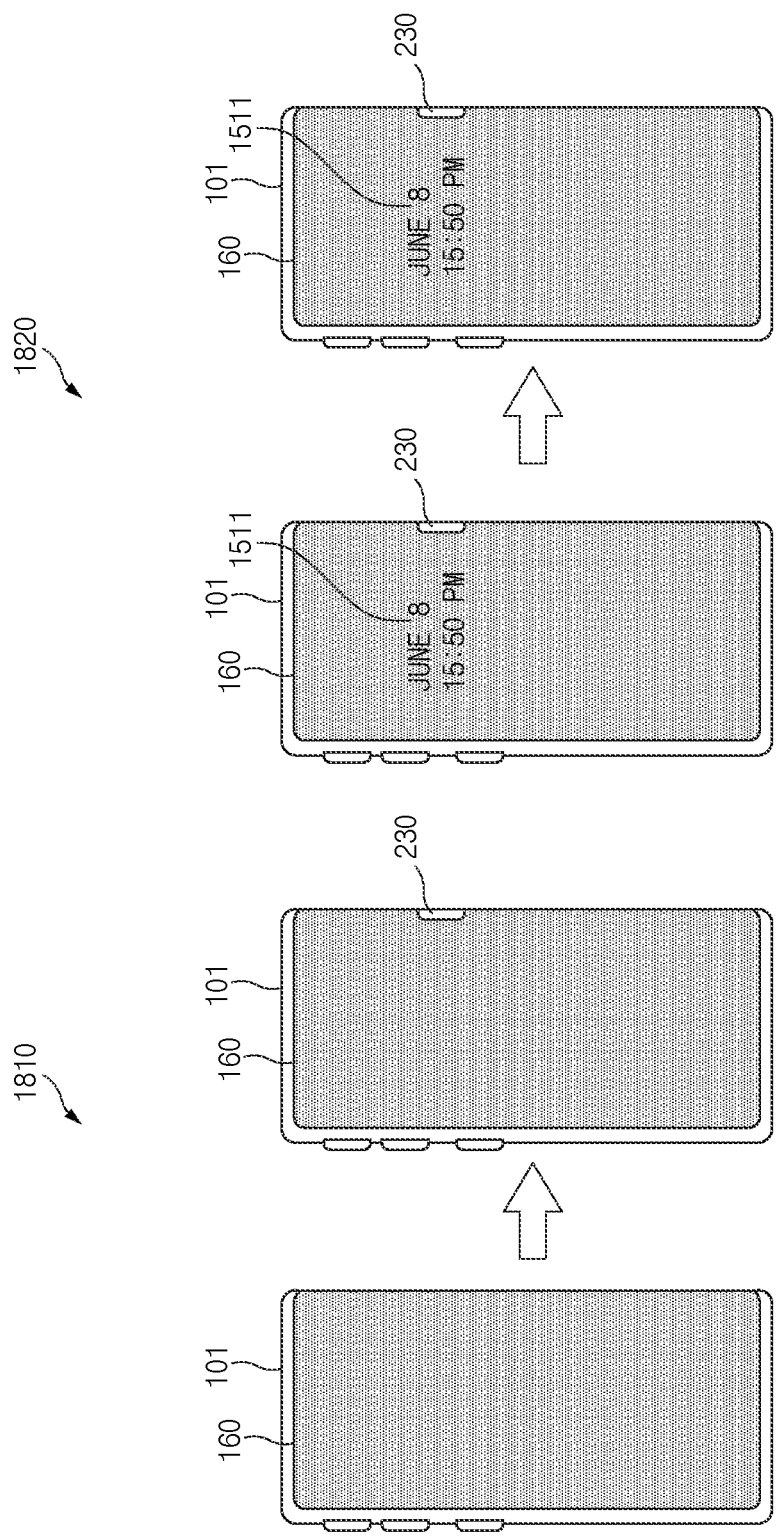
FIG. 18 is a diagram illustrating an electronic device according to various embodiments.

Hereinafter, an example operation of the electronic device according to an example embodiment will be described in greater detail below with reference to FIGS. 16, 17, and 18.

Figure 16:
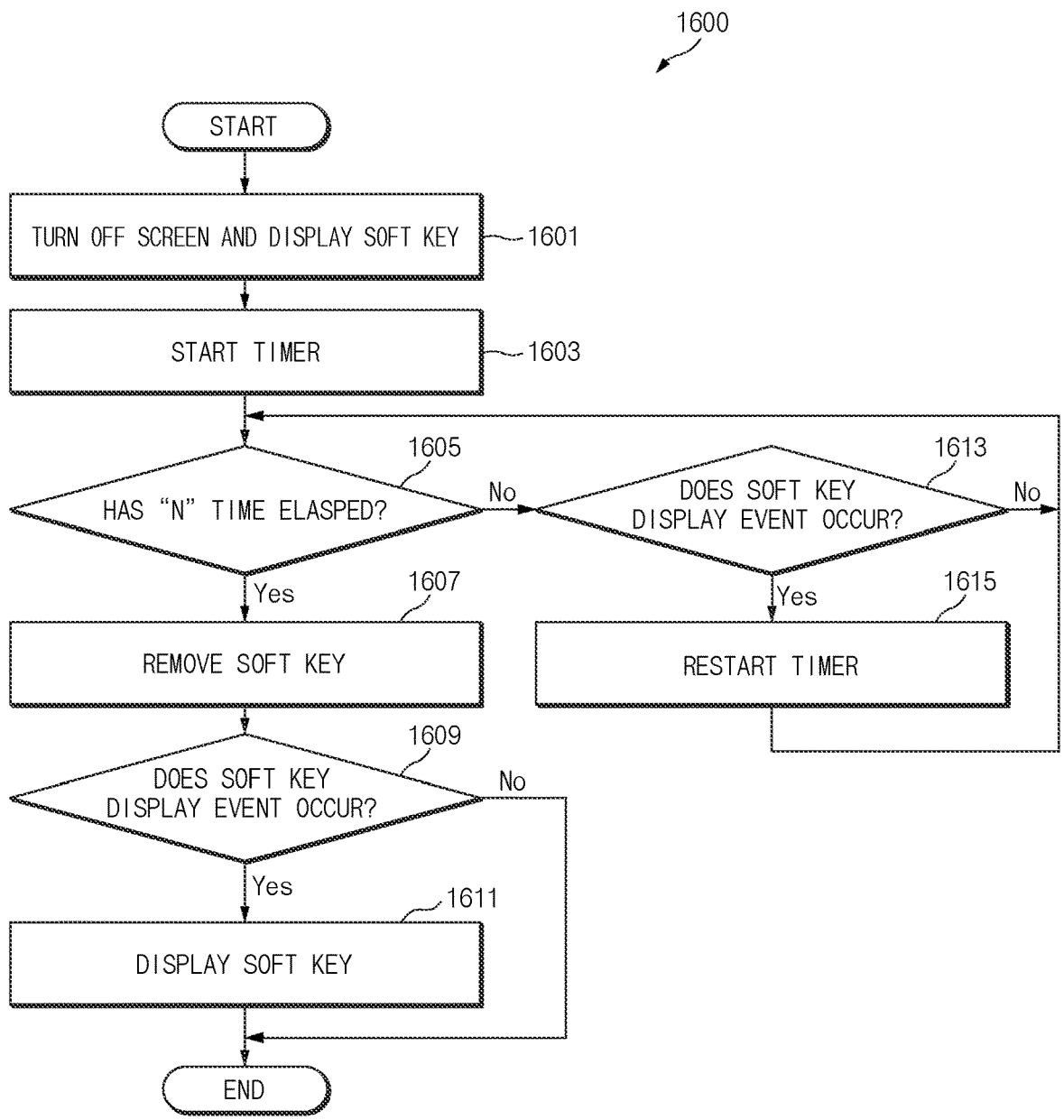
FIG. 16 is a flowchart illustrating an example operation of an electronic device according to various embodiments.

FIG. 16 is a flowchart (1600) illustrating an example operation of an electronic device according to various embodiments. FIG. 17 is a diagram illustrating various views (1710, 1720) of an electronic device according to various embodiments. FIG. 18 is a diagram illustrating various views (1810, 1820) of an electronic device according to various embodiments. The same or similar components as those of the above-described embodiment may be referred to by the same reference numerals, and a description thereof may not be repeated here.

Referring to FIG. 16, in operation 1601, the processor 120 of the electronic device may turn off a screen and display a soft key. The method of calculating the display coordinates of the soft key may be the same as the method described above with reference to FIGS. 2 to 4.

In operation 1603, the processor 120 of the electronic device may start a timer after turning off the screen. The timer may be a timer for an operation for hiding the soft key.

In operation 1605, the processor 120 of the electronic device may determine whether "N" time has elapsed. The "N" time may be a certain threshold value, which may be set by a design of the electronic device or a user's settings.

In operation 1607, the processor 120 of the electronic device may remove the soft key when it is determined that the "N" time has elapsed. When the soft key is removed, the electronic device may switch from the low power mode to a screen-off state. Referring to the first view 1710 of FIG. 17 showing the electronic device 101 in the low power mode, the electronic device 101 may remove the display of the soft key 230 when the "N" time has elapsed after entering the low power mode, and completely switch to the screen-off state. Referring to the second view 1720 of FIG. 17 showing the electronic device 101 in the low power AOD mode, the electronic device 101 may remove the display of the soft key 230 when the "N" time has elapsed after entering the low power AOD mode, and completely switch to the screen-off state.

Referring back to FIG. 16, in operation 1609, the processor 120 of the electronic device may determine whether a soft key display event has occurred. According to an embodiment, the soft key display event may be caused by at least one of a user's gesture input corresponding to the display of the soft key, detection of a movement of the electronic device, detection of a grip on the electronic device, detection of a user's touch on a display, or a request from the system.

In operation 1611, the processor 120 of the electronic device may display the soft key on the display as it is determined that the soft key display event has occurred. Referring to the first view 1810 of FIG. 18 showing the electronic device 101 in the low power mode, when the electronic device 101 identifies occurrence of a soft key display event in a state in which the soft key is not displayed, the electronic device 101 may display the soft key 230 on the display 160. Referring to the second view 1820 of FIG. 18 showing the electronic device 101 in the low power AOD mode, the electronic device 101 may display the AOD content 1511, and when the electronic device 101 identifies occurrence of a soft key display event in a state in which the soft key is not displayed, display the soft key 230 on the display 160.

Referring back to FIG. 16, when it is determined that the "N" time has not elapsed in operation 1605, the processor 120 of the electronic device may determine whether the soft key display event has occurred in operation 1613. According to an embodiment, the soft key display event may be caused by at least one of a user's gesture input corresponding to the display of the soft key, detection of a movement of the electronic device, detection of a grip on the electronic device, detection of a user's touch on a display, or a request from the system.

When it is determined in operation 1613 that the soft key display event has occurred, in operation 1615, the processor 120 of the electronic device may restart a timer. After restarting the timer in operation 1615, the processor 120 of the electronic device may return to operation 1605 to determine whether the "N" time for removing display of the soft key has elapsed.

When it is determined in operation 1613 that the soft key display event has not occurred, the processor 120 of the electronic device may return to operation 1605 again without restarting the timer to determine whether the "N" time for removing display of the soft key has elapsed.

For example, when an event for displaying the soft key has occurred before the "N" time for removing display of the soft key has elapsed, the electronic device may restart a timer for removing display of the soft key while the soft key is being continuously displayed.

An electronic device according to various example embodiments includes: a housing including a first side, a second side, a third side, and a fourth side, a variable display coupled to the housing and having a changeable position of a side area surrounding the first side, a sensor configured to detect a change in the position of the side area, and a processor electrically connected to the variable display and the sensor, wherein the processor may be configured to: obtain data on a state change of the variable display through the sensor, calculate an amount of change in the position of the side area based on the data on the state change, and change display coordinates of a soft key based on the calculated amount of change.

According to an example embodiment of the disclosure, the sensor may include a ToF (time-of-flight) sensor, and the ToF sensor may be configured to detect an amount of reflection of light emitted toward the first side to obtain the data on the state change.

According to an example embodiment of the disclosure, the sensor may include an illuminance sensor, and the illuminance sensor may be disposed under the variable display and configured to detect an amount of light incident on the variable display to obtain the data on the state change.

According to an example embodiment of the disclosure, the sensor may include a proximity sensor, and the proximity sensor may be disposed under the variable display and configured to detect a range in which an adjacent object is detected based on at least a part of the variable display being positioned in the housing to obtain the data on the state change.

According to an example embodiment of the disclosure, the sensor may include a touch screen panel, and the touch screen panel may be disposed under the variable display and configured to detect hovering based on at least a part of the variable display being positioned in the housing to obtain the data on the state change.

According to an example embodiment of the disclosure, the sensor may include a rotary encoder, at least a part of the variable display may be rolled on the rotary encoder, and the rotary encoder may be configured to detect an amount of rotation of the rotary encoder to obtain the data on the state change.

According to an example embodiment of the disclosure, the sensor may include a bending sensor, and the bending sensor may be disposed under the variable display and configured to detect an amount of bending to obtain the data on the state change.

According to an example embodiment of the disclosure, the electronic device may further include a grip sensor, and the processor may be configured to: detect a grip position on the electronic device through the grip sensor and change the display coordinates of the soft key based on the detected grip position.

According to an example embodiment of the disclosure, the sensor may include a sensor for detecting at least one of an iris, a face, or a grip, and the sensor may be configured to detect at least one of the iris, the face, or the grip to obtain the data on the state change including data on a gaze area.

According to an example embodiment of the disclosure, the processor may display the soft key on the variable display based on a low power mode being started, remove the soft key from the variable display based on no specific input being detected until a specific time has elapsed after the low power mode is started, and restart a timer based on there being the specific input until the specific time has elapsed after the low power mode is started.

According to an example embodiment of the disclosure, a method of displaying a soft key on a variable display of an electronic device includes: obtaining data on a change in a state of the variable display through a sensor of the electronic device, calculating an amount of change in a position of a side area of the variable display based on the data on the state change, the side area being an area corresponding to a portion of the variable display surrounding a first side of a housing of the electronic device, and changing display coordinates of the soft key based on the calculated amount of change.

According to an example embodiment of the disclosure, the sensor may include a ToF (time-of-flight) sensor, and the ToF sensor may be configured to detect an amount of reflection of light emitted toward the first side to obtain the data on the state change.

According to an example embodiment of the disclosure, the sensor may include an illuminance sensor, and the illuminance sensor may be disposed under the variable display and configured to detect an amount of light incident on the variable display to obtain the data on the state change.

According to an example embodiment of the disclosure, the sensor may include a proximity sensor, and the proximity sensor may be disposed under the variable display and configured to detect a range in which an adjacent object is detected when at least a part of the variable display is positioned in the housing to obtain the data on the state change.

According to an example embodiment of the disclosure, the sensor may include a touch screen panel, and the touch screen panel may be disposed under the variable display and configured to detect hovering based on at least a part of the variable display being positioned in the housing to obtain the data on the state change.

According to an example embodiment of the disclosure, the sensor may include a rotary encoder, at least a part of the variable display may be rolled on the rotary encoder, and the rotary encoder may be configured to detect an amount of rotation of the rotary encoder to obtain the data on the state change.

According to an example embodiment of the disclosure, the sensor may include a bending sensor, and the bending sensor may be disposed under the variable display and configured to to detect an amount of bending to obtain the data on the state change.

According to an example embodiment of the disclosure, the electronic device may further include a grip sensor, and the method may further include detecting a grip position on the electronic device through the grip sensor and changing the display coordinates of the soft key based on the detected grip position.

According to an example embodiment of the disclosure, the sensor may include a sensor for detecting at least one of an iris, a face, or a grip, and the sensor may be configured to detect at least one of the iris, the face, or the grip to obtain the data on the state change including data on a gaze area.

According to an example embodiment of the disclosure, the method may further include: displaying the soft key on the variable display based on a low power mode being started, removing the soft key from the variable display based on specific input not being input until a specific time has elapsed after the low power mode is started, and restarting a timer based on there being the specific input until the specific time has elapsed after the low power mode is started.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

The invention claimed is:

1. An electronic device comprising:
    a housing including a first side, a second side, a third side, and a fourth side, wherein the first side is slidable;
    a variable display coupled to the housing to at least partially surround the first side, and having a changeable display area based on a slide amount of the first side;
    a sensor configured to detect a position of the first side; and
    a processor electrically connected to the variable display and the sensor;
    wherein the processor is configured to:
        display a soft key on a part of a first display area corresponding to a first position of the first side, and change display coordinates of the soft key into a second display area corresponding to a second position of the first side, based on the first position of the first side being changed into the second position corresponding to a movement of the first side.

2. The electronic device of claim 1, wherein the sensor includes a ToF (time-of-flight) sensor, and
wherein the ToF sensor is configured to detect an amount of reflection of light emitted toward the first side to obtain data on the position of the first side.

3. The electronic device of claim 1, wherein the sensor includes an illuminance sensor, and
wherein the illuminance sensor is disposed under the variable display and configured to detect an amount of light incident on the variable display to obtain data on the position of the first side.

4. The electronic device of claim 1, wherein the sensor includes a proximity sensor, and
wherein the proximity sensor is disposed under the variable display and configured to detect a range in which an adjacent object is detected based on at least a part of the variable display being positioned in the housing to obtain data on the position of the first side.

5. The electronic device of claim 1, wherein the sensor includes a touch screen panel, and
wherein the touch screen panel is disposed under the variable display and configured to detect hovering based on at least a part of the variable display being positioned in the housing to obtain data on the position of the first side.

6. The electronic device of claim 1, wherein the sensor includes a rotary encoder, and at least a part of the variable display is rolled on the rotary encoder, and
wherein the rotary encoder is configured to detect an amount of rotation of the rotary encoder to obtain data on the position of the first side.

7. The electronic device of claim 1, wherein the sensor includes a bending sensor, and
wherein the bending sensor is disposed under the variable display and configured to detect an amount of bending to obtain data on the position of the first side.

8. The electronic device of claim 1, further comprising:
a grip sensor,
wherein the processor is configured to: detect a grip position on the electronic device through the grip sensor and change the display coordinates of the soft key based on the detected grip position.

9. The electronic device of claim 1, wherein the sensor includes a sensor configured to detect at least one of an iris, a face, or a grip, and
wherein the processor is configured to: change display coordinates of the soft key into the second display area based on at least one of the iris, the face, or the.

10. The electronic device of claim 1, wherein the processor is configured to: configured to control the variable display to display the soft key on the variable display based on a low power mode being started, remove the soft key from the variable display based on there being no specific input until a specific time has elapsed after the low power mode is started, and restart a timer based on there being the specific input until the specific time has elapsed after the low power mode is started.

11. A method of displaying a soft key on a variable display of an electronic device comprising a housing including a first side, a second side, a third side, and a fourth side, wherein the first side is slidable, and a variable display coupled to the housing to surround the first side, and comprising a changeable display area based on a slide amount of the first side, the method comprising:
displaying the soft key on a part of a first display area corresponding to a first position of the first side; and
when the first position of the first side changes into a second position corresponding to a movement of the first side, changing display coordinates of the soft key into a second display area corresponding to the second position of the first side.

12. The method of claim 11, wherein the sensor includes a ToF (time-of-flight) sensor, and
wherein the ToF sensor is configured to detect an amount of reflection of light emitted toward the first side to obtain data on the first position of the first side and the second position of the first side.

13. The method of claim 11, wherein the sensor includes an illuminance sensor, and
wherein the illuminance sensor is disposed under the variable display and configured to detect an amount of light incident on the variable display to obtain data on the first position of the first side and the second position of the first side.

14. The method of claim 11, wherein the sensor includes a proximity sensor, and
wherein the proximity sensor is disposed under the variable display and configured to detect a range in which an adjacent object is detected based on at least a part of the variable display being positioned in the housing to obtain data on the first position of the first side and the second position of the first side.

15. The method of claim 11, wherein the sensor includes a touch screen panel, and
wherein the touch screen panel is disposed under the variable display and configured to detect hovering based on at least a part of the variable display being positioned in the housing to obtain data on the first position of the first side and the second position of the first side.

16. The method of claim 11, wherein the sensor includes a rotary encoder, and at least a part of the variable display is rolled on the rotary encoder,
wherein the rotary encoder is configured to detect an amount of rotation of the rotary encoder to obtain data on the first position of the first side and the second position of the first side.

17. The method of claim 11, wherein the sensor includes a bending sensor, and
wherein the bending sensor is disposed under the variable display and configured to detect an amount of bending to obtain data on the first position of the first side and the second position of the first side.

18. The method of claim 11, wherein the electronic device further includes a grip sensor,
the method further comprising:
detecting a grip position on the electronic device through the grip sensor and changing the display coordinates of the soft key based on the detected grip position.

19. The method of claim 11, wherein the sensor includes a sensor configured to detect at least one of an iris, a face, or a grip, and
the method further comprising:
changing display coordinates of the soft key into the second display area based on at least one of the iris, the face, or the grip.

20. The method of claim 11, further comprising:
displaying the soft key on the variable display based on a low power mode being started, removing the soft key from the variable display based on there being no specific input until a specific time has elapsed after the low power mode is started, and restarting a timer based on there being the specific input until the specific time has elapsed after the low power mode is started.

* * * * *